United States Patent
Norita et al.

(10) Patent No.: US 10,798,721 B2
(45) Date of Patent: Oct. 6, 2020

(54) WIRELESS BASE STATION DEVICE, SERVER, AND WIRELESS COMMUNICATION METHOD FOR COMMUNICATING PRIORITY DATA AND NON-PRIORITY DATA

(71) Applicant: Panasonic Intellectual Property Management Co., Ltd., Osaka (JP)

(72) Inventors: Sojiro Norita, Kanagawa (JP); Osamu Kato, Fukuoka (JP); Hiroaki Asano, Kanagawa (JP); Yasufumi Ichikawa, Kanagawa (JP); Noriyuki Shimizu, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/737,994

(22) PCT Filed: Feb. 25, 2016

(86) PCT No.: PCT/JP2016/001004
§ 371 (c)(1),
(2) Date: Dec. 19, 2017

(87) PCT Pub. No.: WO2017/002279
PCT Pub. Date: Jan. 5, 2017

(65) Prior Publication Data
US 2018/0249477 A1    Aug. 30, 2018

(30) Foreign Application Priority Data

Jun. 30, 2015 (JP) ................................ 2015-131371
Sep. 7, 2015 (JP) ................................ 2015-176041

(51) Int. Cl.
*H04W 72/04* (2009.01)
*H04W 72/10* (2009.01)
(Continued)

(52) U.S. Cl.
CPC .......... *H04W 72/10* (2013.01); *H04W 28/24* (2013.01); *H04W 28/26* (2013.01); *H04W 48/20* (2013.01); *H04W 72/042* (2013.01)

(58) Field of Classification Search
CPC ... H04W 72/10; H04W 72/042; H04W 28/24; H04W 28/26; H04W 48/20
See application file for complete search history.

(56) References Cited

U.S. PATENT DOCUMENTS 5,862,485 A  * 1/1999 Linneweh, Jr. ....... H04W 72/10
                                                     455/450
8,953,596 B2   2/2015 Payyappilly et al.
(Continued)

FOREIGN PATENT DOCUMENTS

CN    101841791 A  * 9/2010
JP    2001-045554 A    2/2001
(Continued)

OTHER PUBLICATIONS

International Search Report, dated Apr. 5, 2016, for corresponding International Application No. PCT/JP2016/001004, 4 pages.

*Primary Examiner* — Hassan Kizou
*Assistant Examiner* — Mahbubul Bar Chowdhury
(74) *Attorney, Agent, or Firm* — Seed IP Law Group LLP

(57) ABSTRACT

There is provided a wireless base station device capable of reducing a communication delay time related to communication of a priority call. A wireless base station device includes a processor a memory, and an antenna. The memory stores a wireless resource allocated to a priority call of radio channels for transmission of data with a wireless communication terminal before a priority call is generated under the control of the processor. The processor allocates the wireless resource stored in the memory to a generated priority call.

(Continued)

The antenna performs communication of data of the priority call by using the allocated wireless resource.

19 Claims, 11 Drawing Sheets

(51) Int. Cl.
*H04W 28/26* (2009.01)
*H04W 28/24* (2009.01)
*H04W 48/20* (2009.01)

(56) References Cited

U.S. PATENT DOCUMENTS

| | | | | |
|---|---|---|---|---|
| 2005/0083843 | A1* | 4/2005 | Pinault | H04W 76/18 |
| | | | | 370/230 |
| 2006/0084445 | A1* | 4/2006 | Minami | H04W 28/08 |
| | | | | 455/452.1 |
| 2007/0004421 | A1* | 1/2007 | Chambers | H04W 72/10 |
| | | | | 455/450 |
| 2007/0160045 | A1 | 7/2007 | Payyappilly et al. | |
| 2009/0069019 | A1* | 3/2009 | Hayama | H04W 48/20 |
| | | | | 455/445 |
| 2014/0057588 | A1* | 2/2014 | Ostrup | H04W 28/26 |
| | | | | 455/404.1 |
| 2015/0103653 | A1 | 4/2015 | Payyappilly et al. | |
| 2016/0113024 | A1* | 4/2016 | Shin | H04W 72/087 |
| | | | | 455/452.2 |

FOREIGN PATENT DOCUMENTS

| | | |
|---|---|---|
| JP | 2005-086694 A | 3/2005 |
| JP | 2007-043310 A | 2/2007 |
| JP | 2007-089001 A | 4/2007 |
| JP | 2009-522959 A | 6/2009 |
| WO | 2007/117724 A2 | 10/2007 |

* cited by examiner

FIG. 10

| QCI IDENTIFICATION NUMBER | RESOURCE TYPE | PRIORITY | ALLOWABLE DELAY TIME | ALLOWABLE PER | SERVICE NAME |
|---|---|---|---|---|---|
| 1 | GBR | 2 | 100ms | $10^{-2}$ | VoIP |
| 2 | GBR | 4 | 150ms | $10^{-3}$ | Video call |
| 3 | GBR | 5 | 300ms | $10^{-6}$ | STREAMING |
| 4 | GBR | 3 | 50ms | $10^{-3}$ | REAL-TIME GAME |
| 5 | Non-GBR | 1 | 100ms | $10^{-6}$ | IMS SIGNALING |
| 6 | Non-GBR | 7 | 100ms | $10^{-3}$ | INTERACTIVE GAME |
| 7 | Non-GBR | 6 | 300ms | $10^{-6}$ | TCP PROTOCOL (BROWSING, ELECTRONIC MAIL, FILE DOWNLOAD) |
| 8 | Non-GBR | 8 | 300ms | $10^{-6}$ | |
| 9 | Non-GBR | 9 | 300ms | $10^{-6}$ | |

WIRELESS BASE STATION DEVICE, SERVER, AND WIRELESS COMMUNICATION METHOD FOR COMMUNICATING PRIORITY DATA AND NON-PRIORITY DATA

TECHNICAL FIELD

The present disclosure relates to a wireless base station device, a server, a wireless communication system, and a wireless communication method.

BACKGROUND ART

In the related art, there is a congestion control device in a mobile communication system performing communication by taking into consideration a priority call (for example, refer to PTL 1). The congestion control device determines an order of stopping communication with calls which are already connected, and stops communication according to the determined sequence so as to release resources.

In recent years, wireless communication based on 5G (fifth generation mobile communication system) has started to be examined.

CITATION LIST

Patent Literature

PTL 1; Japanese Patent Unexamined Publication No. 2007-043310

SUMMARY OF THE INVENTION

In a wireless communication system of 5G, data transmission in a low delay time is necessary. In the technique disclosed in PTL 1, a communication delay time is generated due to disconnection of a call which is already connected or execution of a protocol for re-allocation of a wireless resource after disconnection in order to perform communication of a priority call. Thus, it is difficult to satisfy the need for a low delay time required in 5G.

The present disclosure has been made in consideration of the circumstances, and provides a wireless base station device, a server, a wireless communication system, and a wireless communication method capable of reducing a communication delay time related to communication of a priority call.

A wireless base station device of the present disclosure includes a processor; a memory; and an antenna. The memory, by the control of the processor, stores a wireless resource allocated to a priority call of radio channels via which data is transmitted between a wireless communication terminal and the wireless base station device before the priority call is generated. The processor allocates the wireless resource stored in the memory to a generated priority call, and the antenna performs communication of data of the priority call by using the allocated wireless resource.

According to the present disclosure, it is possible to reduce a communication delay time related to communication of a priority call.

BRIEF DESCRIPTION OF DRAWINGS

FIG. 10 is a schematic diagram illustrating detailed examples of QCI parameters.

DESCRIPTION OF EMBODIMENTS

Hereinafter, exemplary embodiments will be described in detail with reference to the drawings. However, a more detailed description than necessary will be omitted in some cases. For example, a detailed description of the well-known content or a repeated description of the substantially same configuration will be omitted in some cases. This is so that a person skilled in the art can easily understand the invention by preventing the following description from being unnecessarily redundant. The accompanying drawings and the following description are provided for a person skilled in the art to sufficiently understand the present disclosure, and are not intended to limit the subject recited in the claims.

First Exemplary Embodiment

[Configuration and the Like]
[Configuration of Wireless Communication System]

Figure 1:
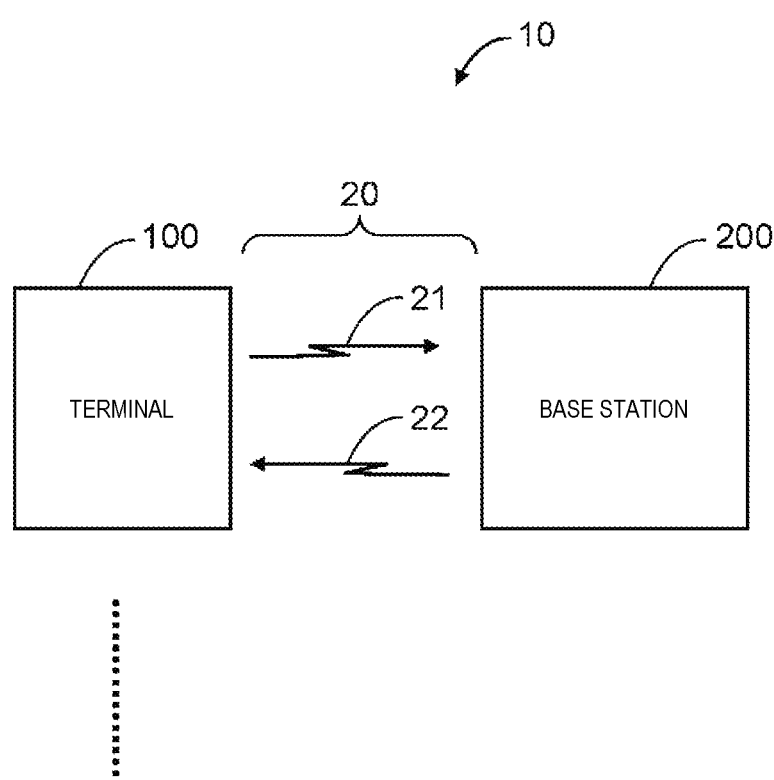
FIG. 1 is a block diagram illustrating a configuration example of a wireless communication system in a first exemplary embodiment.

FIG. 1 is a block diagram illustrating a configuration example of wireless communication system 10 in a first exemplary embodiment. Wireless communication system 10 includes one or more terminals 100 and one or more base stations 200. Wireless communication system 10 is, for example, a wireless communication system of 5G. Terminal 100 and base station 200 are connected to each other via radio channels 20.

Terminal 100 includes, for example, a smart phone, and a tablet terminal. Base station 200 includes, for example, a base transceiver station (BTS) or an access point (AP). Terminal 100 may be applied to an on-vehicle wireless communication device.

Various pieces of data can be transmitted and received between terminal 100 and base station 200 by using wireless resources. The various pieces of data include, for example, data (also referred to as priority data) requiring a low delay time and data (also referred to as non-priority data) not requiring a low delay time. The priority data is transmitted and received by using a priority call. The non-priority data is transmitted and received by using a non-priority call.

The various pieces of data include, for example, data for controlling a brake of a vehicle, data for financial transaction, smoke detection data, image data (for example, a moving image and a still image), sound data, and music data. For example, the data for controlling a brake of a vehicle or the data for financial transaction is priority data, and the music data is non-priority data.

The low delay time is, for example, a communication delay time of 1 millisecond (ms) or less. The low delay time can satisfy the need for a communication delay time, for example, in remote control (brake control or the like) for a vehicle, electronic commerce (stock transaction or the like) in which every second counts, and an online game.

The wireless resources include, for example, radio frequencies used for communication, and a part of a radio frequency (a part of a frequency axis, a part of a time axis, or a combination thereof). A part of a frequency axis indicates, for example, a sub-carrier frequency or a bundle of a plurality of sub-carrier frequencies. A part of a time axis indicates, for example, a time slot or a bundle of a plurality of time slots.

Radio channels 20 are, for example, 5G channels, and include uplink channel 21 and downlink channel 22. Uplink channel 21 is a radio channel directed from terminal 100 toward base station 200. Downlink channel 22 is a radio channel directed from base station 200 toward terminal 100. Radio channels 20 widely include various public channels, mobile phone channels, and wide radio channels.

[Configuration of Terminal]

Figure 2:
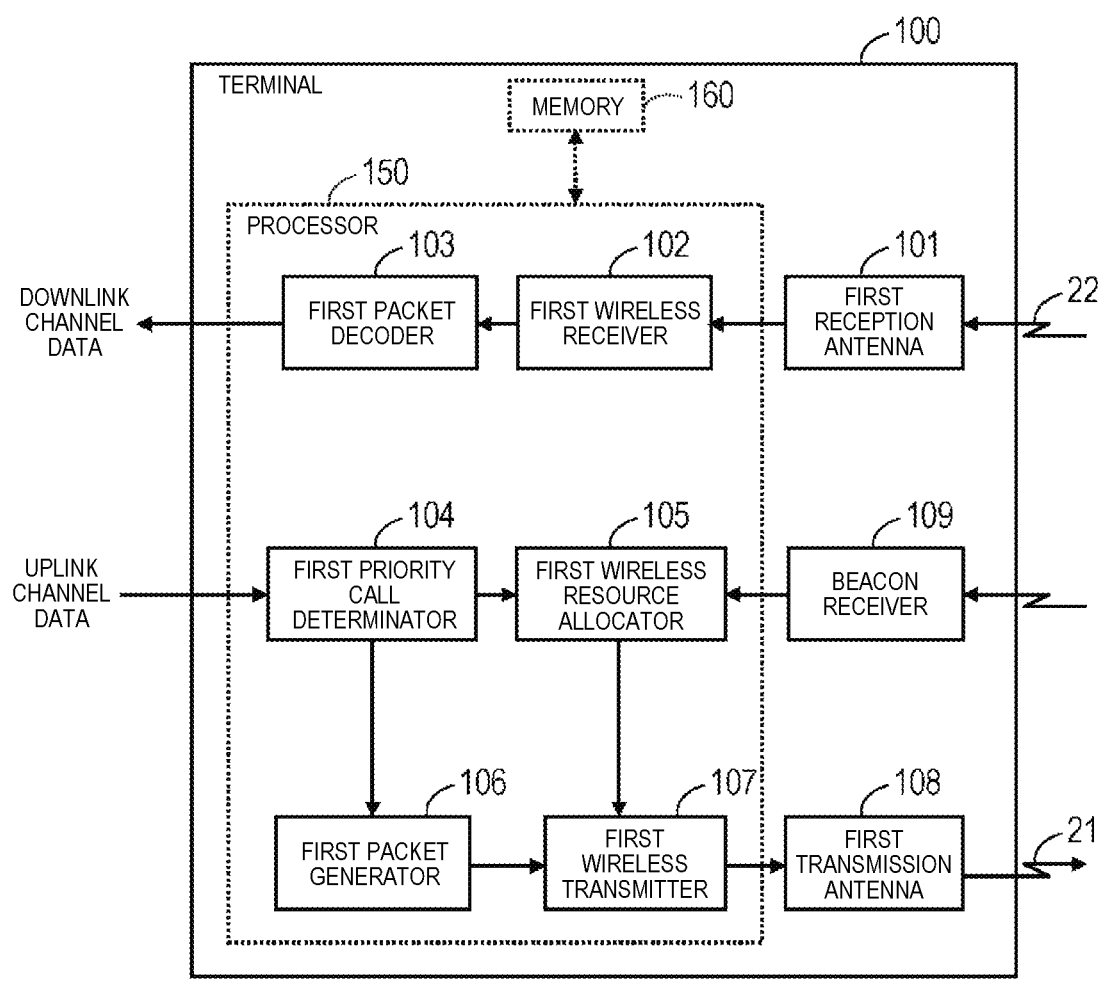
FIG. 2 is a block diagram illustrating a configuration example of a terminal in the first exemplary embodiment.

FIG. 2 is a block diagram illustrating a configuration example of terminal 100. Terminal 100 includes processor 150, memory 160, first reception antenna 101, first transmission antenna 108, and beacon receiver 109.

Processor 150 performs various processes or control in cooperation with memory 160. Specifically, processor 150 performs a program stored in memory 160 so as to realize functions of the following respective units. The respective units include first wireless receiver 102, first packet decoder 103, first priority call determinator 104, first wireless resource allocator 105, first packet generator 106, and first wireless transmitter 107.

Memory 160 stores, for example, various pieces of data, pieces of information, and programs. Memory 160 may be built into processor 150. Memory 160 may include a secondary storage device along with a primary storage device. The primary storage device includes, for example, a random access memory (RAM) and a read only memory (ROM). The secondary storage device includes, for example, a hard disk memory (HDD) and a solid state drive (SSD).

First wireless receiver 102 receives a packet (first reception packet) from base station 200 via downlink channel 22 and first reception antenna 101.

First packet decoder 103 decodes the first reception packet so as to obtain first decoded data. The first decoded data includes data of downlink channel 22. The data of downlink channel 22 is forwarded to memory 160, an external device (not illustrated) such as a storage device or a display device, and a processor (not illustrated) of various pieces of software.

First priority call determinator 104 determines whether or not data of uplink channel 21 is priority data, that is, a call for transmitting the data of uplink channel 21 is a priority call. In a case of a priority call, first priority call determinator 104 sends a notification of the priority call to first wireless resource allocator 105. First priority call determinator 104 sends the data of uplink channel 21 to first packet generator 106.

If the notification of the priority call is received, first wireless resource allocator 105 refers to memory 160, and allocates a vacant wireless resource among wireless resources which are reserved for priority calls of uplink channel 21 in base station 200, to the priority call. In a case where the notification of a priority call is not received, first wireless resource allocator 105 refers to, for example, memory 160, and allocates a vacant wireless resource among wireless resources which are not reserved for priority calls of uplink channel 21 or downlink channel 22 in base station 200, to a non-priority call. First wireless resource allocator 105 may allocate a vacant wireless resource among wireless resources which are not reserved for priority calls of uplink channel 21 or downlink channel 22 in base station 200, to a priority call. First wireless resource allocator 105 sends information regarding the allocated wireless resource to first wireless transmitter 107.

First packet generator 106 generates a packet (first transmission packet) including data of uplink channel 21. First packet generator 106 sends the generated first transmission packet to first wireless transmitter 107.

First wireless transmitter 107 receives the information regarding the allocated wireless resource and the first transmission packet. First wireless transmitter 107 transmits the first transmission packet to base station 200 by using the allocated wireless resource via uplink channel 21 and first transmission antenna 108.

Beacon receiver 109 receives a beacon signal from base station 200 via a reception antenna. The reception antenna may be an antenna (not illustrated) which is different from first reception antenna 101, and may be first reception antenna 101.

Communication of a beacon signal does not necessarily require a strict low delay time depending on an application field. In other words, it is not necessary to perform communication of a beacon signal with 5G channels, and communication of a beacon signal may be performed with other communication means, and a beacon signal may be treated as data which does not require a low delay time in the same 5G communication. In an application field in which communication of a beacon signal requires a strict low delay time, the beacon signal may be treated as data requiring a low delay time using 5G channels.

The beacon signal includes, for example, information regarding wireless resources reserved for priority calls of uplink channel 21 in base station 200 or a vacant (unallocated) wireless resource among the wireless resources. The information regarding a wireless resource of uplink channel 21 included in the beacon signal is sent to and stored in memory 160, or is sent to first wireless resource allocator 105.

[Configuration of Base Station]

Figure 3:
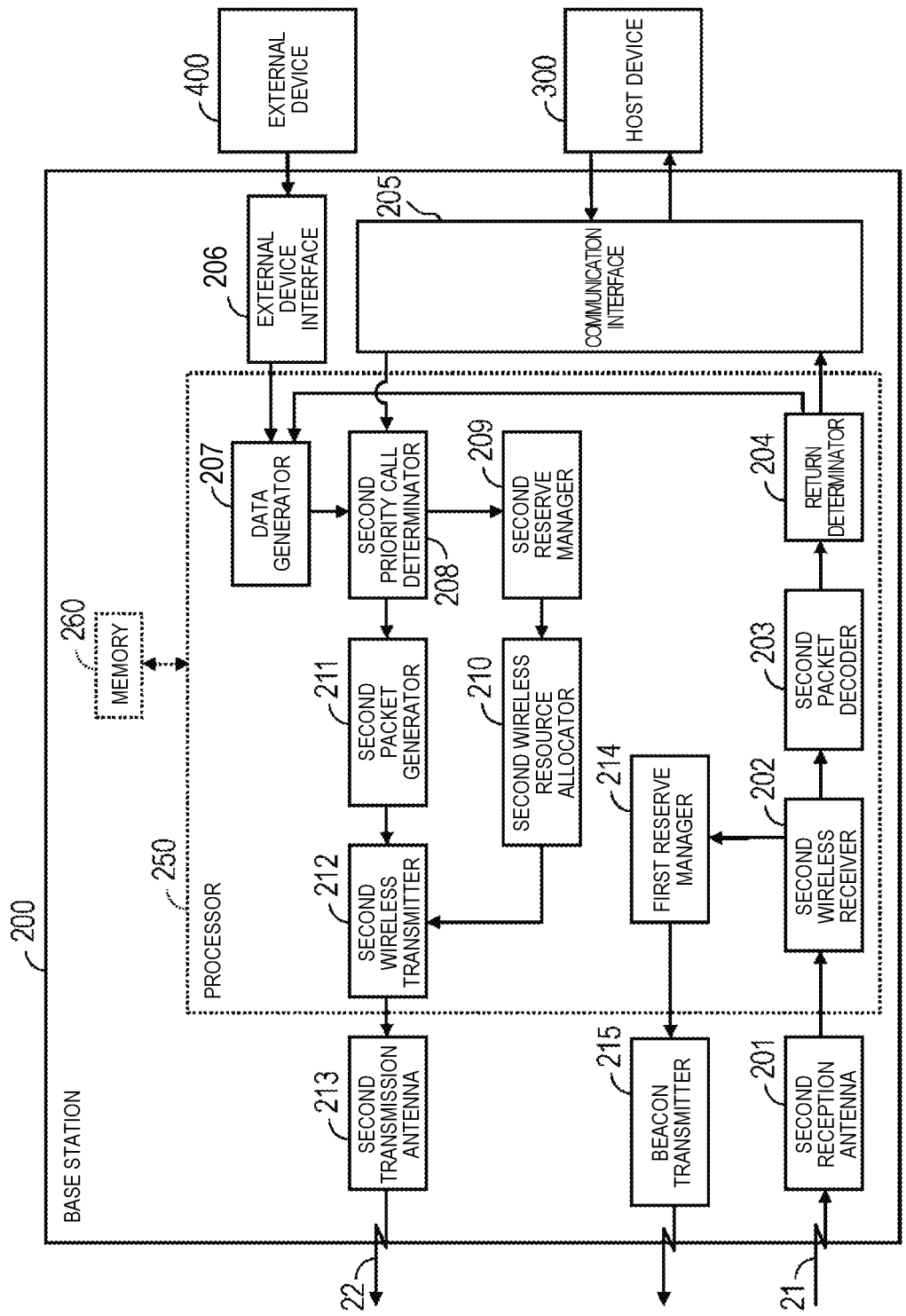
FIG. 3 is a block diagram illustrating a configuration example of a base station in the first exemplary embodiment.

FIG. 3 is a block diagram illustrating a configuration example of base station 200. Base station 200 includes processor 250, memory 260, second reception antenna 201, second transmission antenna 213, communication interface 205, external device interface 206, and beacon transmitter 215.

Processor 250 performs various processes or control in cooperation with memory 260. Specifically, processor 250 performs a program stored in memory 260 so as to realize functions of the following respective units. The respective units include second wireless receiver 202, second packet decoder 203, return determinator 204, data generator 207, second priority call determinator 208, second reserve manager 209, second wireless resource allocator 210, second packet generator 211, second wireless transmitter 212, and first reserve manager 214.

The memory 260 stores, for example, various pieces of data, pieces of information, and programs. Memory 260 may be built into processor 250. Memory 260 may include a secondary storage device along with a primary storage device. The primary storage device includes, for example, a RAM and a ROM. The secondary storage device includes, for example, an HDD and an SSD.

Second wireless receiver 202 receives a packet (second reception packet) from terminal 100 via uplink channel 21 and second reception antenna 201.

Second packet decoder 203 decodes the second reception packet so as to obtain second decoded data. The second decoded data includes data of uplink channel 21. The data of uplink channel 21 is sent to, for example, host device 300, terminal 100, memory 260, external device 400 such as a storage device or a display device, and a processor (not illustrated) of various pieces of software.

Return determinator 204 receives the data of uplink channel 21, and determines whether the data of uplink channel 21 will be transmitted to host device 300 or data based on the data of uplink channel 21 will be transmitted to terminal 100, on the basis of an application using the data of uplink channel 21. In other words, base station 200 determines whether or not data treated in an application layer is priority data.

The application mentioned here includes, for example, a vehicle control application treating brake control data or the like, an electronic commerce application treating electronic commerce data, and a game application treating game operation data or the like.

Transmitting (reply) data to some of the plurality of terminals 100 on the basis of acquired data will be also referred to as "returning" herein. Here, a destination of transmission from base station 200 via downlink channel 22 may or not include terminal 100 having performed transmission to base station 200 via uplink channel 21. Return determinator 204 may determine that data (packet) acquired from terminal 100 is returned as it is, and may determine that data as a result of performing information processing on acquired data of uplink channel 21 is returned in order for destination terminal 100 to perform an appropriate process. As mentioned above, terminal 100 as a transmission destination to which base station 200 transmits data due to returning of data includes at least one of terminal 100 having transmitted data acquired by base station 200 and terminals 100 other than terminal 100 having transmitted the data.

Data to be returned is determined by, for example, an application. For example, priority data is a return target, but non-priority data may be returned. Since data is returned to terminal 100, it is possible to reduce a communication delay time of data communication compared with general communication in which data is transmitted from base station 200 to host device 300.

Host device 300 is a device corresponding to a connection portion between a core network and a radio access network in 5G. Host device 300 indicates a device corresponding to a serving gateway (SGW) in Long Term Evolution (LTE), and a serving general packet radio service support node (SGSN) in Wideband Code Division Multiple Access (W-CDMA).

In a case where data is returned, return determinator 204 sends data of uplink channel 21 to data generator 207. In a case where data is not returned, return determinator 204 sends data of uplink channel 21 to communication interface 205.

Communication interface 205 performs communication with host device 300. A communication method in communication interface 205 is, for example, a wired (for example, an optical channel) or wireless 5G communication method.

For example, communication interface 205 transmits data (for example, non-priority data) in uplink channel 21 to host device 300, and receives data (for example, non-priority data) in downlink channel 22 from host device 300.

Communication interface 205 may return data to terminal 100, and may also transmit data of uplink channel 21 to host device 300, even in a case of a priority call.

External device interface 206 is connected to external device 400, and acquires (receives, for example) data from external device 400. External device 400 includes, for example, a sensor. The sensor includes, for example, a smoke detection sensor. A communication method in external device interface 206 includes, for example, DECT, Bluetooth (registered trademark), various wired communication method, and various wireless communication methods.

Data generator 207 acquires data from external device interface 206 or data from return determinator 204, and generates data of downlink channel 22 on the basis of the acquired data.

For example, data generator 207 receives smoke detection data from external device 400, and generates data including the fact that smoke is detected. For example, data generator 207 receives brake operation data from terminal 100, and generates brake operation data for other vehicles. For example, data generator 207 receives input data for financial transaction from terminal 100, and generates data indicating whether or not financial transaction based on the input data is permitted.

Second priority call determinator 208 determines whether or not data from communication interface 205 or data (data of downlink channel 22) from data generator 207 is priority data, that is, a call for transmitting the data of downlink channel 22 is a priority call. In a case of a priority call, second priority call determinator 208 sends a notification of the priority call to second reserve manager 209. Second priority call determinator 208 sends the data of downlink channel 22 to second packet generator 211.

Second reserve manager 209 secures (reserves) a wireless resource for a priority call of downlink channel 22 in advance, and stores information regarding reserve in memory 260. The information regarding reserve includes, for example, information regarding the reserved wireless resource. Second reserve manager 209 instructs second wireless resource allocator 210 to allocate a wireless resource reserved for downlink channel 22 to the priority call of downlink channel 22.

Second reserve manager 209 receives the notification of the priority call from second priority call determinator 208. Second reserve manager 209 counts the number of generated priority calls of downlink channel 22, and stores a count number in memory 260. Second reserve manager 209 derives (calculates, for example) a reserve amount of wireless resources for downlink channel 22 on the basis of the generation history of priority calls of downlink channel 22. Details deriving a reserve amount of wireless resources will be described later.

If the notification of the priority call is received, second wireless resource allocator 210 refers to memory 260, and allocates a vacant wireless resource among wireless resources which are reserved for priority calls of downlink channel 22, to the priority call. In a case where the notification of a priority call is not received, second wireless resource allocator 210 allocates a vacant wireless resource among wireless resources which are not reserved for priority calls of uplink channel 21 or downlink channel 22. Second wireless resource allocator 210 may allocate a vacant wireless resource among wireless resources which are not reserved for priority calls of uplink channel 21 or downlink channel 22 in base station 200, to a priority call. Second wireless resource allocator 210 sends information regarding the allocated wireless resource to second wireless transmitter 212.

Second packet generator 211 generates a packet (second transmission packet) including data of downlink channel 22. Second packet generator 211 sends the generated second transmission packet to second wireless transmitter 212.

Second wireless transmitter 212 receives the information regarding the allocated wireless resource and the second transmission packet. Second wireless transmitter 212 transmits the second transmission packet to terminal 100 via downlink channel 22 and second transmission antenna 213 by using the allocated wireless resource.

First reserve manager 214 secures (reserves) a wireless resource for a priority call of uplink channel 21 in advance, and stores information regarding reserve in memory 260.

In a case where a call used for uplink channel 21 is a priority call, first reserve manager 214 receives information indicating that the call is a priority call from second wireless receiver 202. First reserve manager 214 counts the number of generated priority calls of uplink channel 21, and stores a count number in memory 260. First reserve manager 214 derives (calculates, for example) a reserve amount of wireless resources for uplink channel 21 on the basis of the generation history of priority calls of uplink channel 21. Details deriving a reserve amount of wireless resources will be described later.

First reserve manager 214 sends information regarding wireless resources reserved for priority calls of uplink channel 21 or a vacant wireless resource among the wireless resources to beacon transmitter 215.

Beacon transmitter 215 transmits a beacon signal to terminal 100 via a transmission antenna. The transmission antenna may be an antenna (not illustrated) which is different from second transmission antenna 213, and may be second transmission antenna 213. The beacon signal includes the information regarding the wireless resource from first reserve manager 214.

[Method of Deriving Reserve Amount of Wireless Resources]

Next, a description will be made of a specific example of a method of deriving a reserve amount of wireless resources. Herein, derivation of a reserve amount of wireless resources for downlink channel 22 will be focused, but this is also the same for derivation of a reserve amount of wireless resources for uplink channel 21.

Second reserve manager 209 determines an amount (reserve amount) of wireless resources reserved for priority calls of downlink channel 22 on the basis of history information regarding an amount of priority calls generated in downlink channel 22 in the past.

A probability that an amount of priority calls requiring x to x+Δx as an amount of wireless resources is generated in a predetermined period is indicated by P(x)·Δx. The predetermined period is, for example, a time for which a priority call of downlink channel 22 continuously occupies a wireless resource, and is, for example, 5 milliseconds. Here, "•" indicates a multiplication sign.

Probability density function P(x) is expressed by a normalized function shown in (Equation 1), for example.

[Equation 1]

$$\int_0^\infty P(x)dx = 1 \quad \text{(Equation 1)}$$

Expected value (mean value) $C_m$ of a required wireless resource amount x is expressed by, for example, (Equation 2).

[Equation 2]

$$\int_0^\infty P(x)dx = 1 \quad \text{(Equation 2)}$$

If an amount of wireless resources reserved for priority calls of downlink channel 22 by second reserve manager 209 is indicated by $C_t$, a reserve amount of wireless resources is insufficient in a case where priority calls of downlink channel 22 of reserved wireless resource amount $C_t$ or more are generated in a predetermined period. A probability (blocking probability) that a reserve amount of wireless resources is insufficient is indicated by $P_B$. Blocking probability $P_B$ is expressed by, for example, (Equation 3), and is $10^{-4}$, $10^{-6}$, $10^{-8}$, or the like. Blocking probability $P_B$ is set by using, for example, a user interface (not illustrated) of base station 200, and is stored in memory 260. Blocking probability $P_B$ corresponds to a blocking probability (permitted $P_B$) permitted by a user.

[Equation 3]

$$P_B = \int_{C_t}^\infty P(x)dx \quad \text{(Equation 3)}$$

As an example, it is assumed that probability density function P(x) conforms to an exponential function distribution. In this case, probability density function P(x) is expressed by, for example, (Equation 4).

[Equation 4]

$$P(x) = A \cdot e^{-Ax} \quad \text{(Equation 4)}$$

In this case, an expected value of required wireless resource amount x is expressed by $C_m = 1/A$, and a blocking probability is expressed by $P_B = e^{-AC_t}$. Therefore, blocking probability PB is expressed by, for example, (Equation 5).

[Equation 5]

$$P_B = e^{-\frac{C_t}{C_m}} \quad \text{(Equation 5)}$$

Thus, in a case where probability density function P(x) conforms to an exponential function distribution, a reserve amount $C_t$ of wireless resources is expressed by, for example, (Equation 6).

[Equation 6]

$$C_t = C_m \log P_B \quad \text{(Equation 6)}$$

As another example, it is assumed that probability density function P(x) conforms to a uniform distribution with an upper limit. In this uniform distribution, for example, it is assumed that P(x)=p at 0≤x≤1/p, and P(x)=0 at 1/p≤x. In this case, expected value $C_m$ of required wireless resource amount x is expressed by, for example, (Equation 7).

[Equation 7]

$$C_m = \int_0^{\frac{1}{p}} x \cdot P dx = \frac{1}{2p} \quad \text{(Equation 7)}$$

Blocking probability $P_B$ is expressed as $1 - C_t \cdot p$ at $0 \leq C_t \leq 1/p$, and as 0 at $1/p \leq C_t$.

In base station 200, in the same manner second reserve manager 209, first reserve manager 214 determines an amount (reserve amount) of wireless resources reserved for priority calls of uplink channel 21 on the basis of history information regarding an amount of priority calls generated uplink channel 21 in the past. A specific method of deriving a reserve amount of wireless resources for priority calls of uplink channel 21 is the same as a method of deriving a reserve amount of wireless resources for priority calls of downlink channel 22.

In a case where there is no vacancy in a reserved wireless resource, and a priority call can use a wireless resource which is not reserved, blocking probability $P_B$ expressed by each of the above equations can be said to be a blocking probability in a state in which there is no vacancy in a wireless resource which is not reserved, that is, the maximum value of the blocking probability.

[Operation and the Like]

Next, a description will be made of an operation example of wireless communication system 10.

Figure 4:
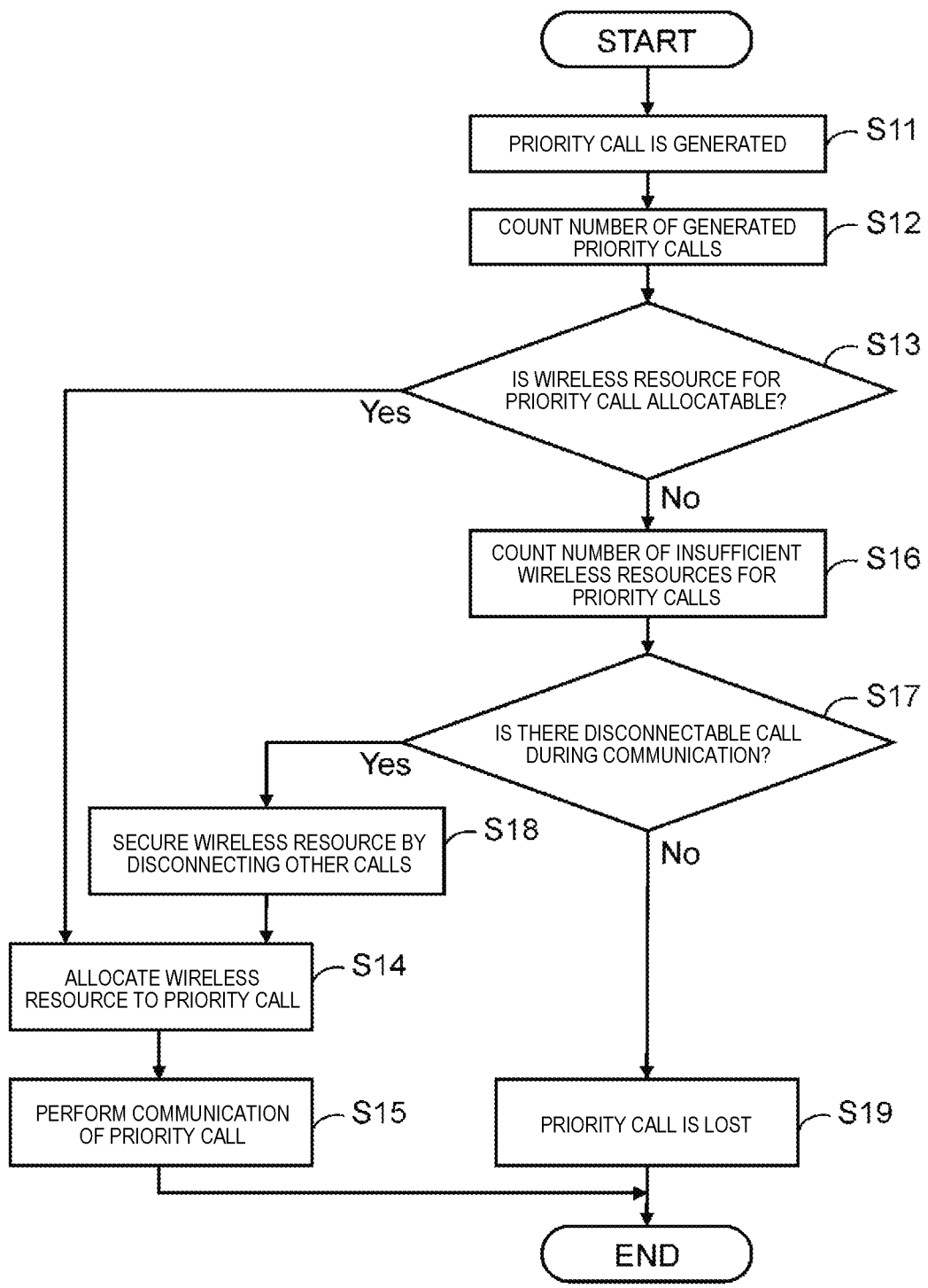
FIG. 4 is a flowchart illustrating an operation example of a first base station.

FIG. 4 is a flowchart illustrating an operation example of base station 200. Herein, an operation related to allocation of a wireless resource in base station 200 will be described, but this is also the same for an operation related to allocation of a wireless resource in terminal 100.

Before the operation illustrated in FIG. 4 is started, second reserve manager 209 reserves wireless resources for priority calls of downlink channel 22, and stores information regarding reserve in memory 260. A reserve amount of wireless resources is determined according to, for example, the above-described derivation method.

First, second priority call determinator 208 determines whether or not a priority call of downlink channel 22 is generated (S11).

In a case where it is determined that a priority call of downlink channel 22 is generated, second reserve manager 209 counts the number of generated priority calls (S12), and stores a count number in memory 260. The count value of generated priority calls is used to derive the reserve amount of wireless resources.

Second wireless resource allocator 210 refers to the wireless resources reserved for priority calls of downlink channel 22, stored in memory 260, and determines whether or not a wireless resource can be allocated to the generated priority call (S13). In the present exemplary embodiment, since the wireless resources for priority calls of downlink channel 22 are reserved, a probability that an amount of wireless resources for priority calls of downlink channel 22 is insufficient is considerably low. In a case where there is no vacancy in the wireless resources reserved for priority calls of downlink channel 22, second wireless resource allocator 210 may allocate a wireless resource which is not reserved.

In a case where a wireless resource can be allocated to the priority call, second wireless resource allocator 210 allocates the wireless resource to the priority call (S14).

Second wireless transmitter 212 transmits a transmission packet of the priority call via second transmission antenna 213 by using the allocated wireless resource (S15).

In a case where a wireless resource cannot be allocated to the priority call in S13, second reserve manager 209 counts the number of insufficient wireless resources for priority calls (S16). Herein, a count number of insufficient wireless resources indicates an insufficiency frequency of wireless resources.

Second wireless resource allocator 210 determines whether or not there is a disconnectable call among calls (also referred to as calls during communication or other calls) which are already connected (S17). Other calls are non-priority calls or other priority calls.

In a case where there is a disconnectable call, second wireless resource allocator 210 disconnects other calls (S18). Base station 200 can secure wireless resources for priority calls due to disconnection of other calls.

In a case where other calls are disconnected, base station 200 performs processes in S14 and S15.

In a case where other disconnectable calls are not present in S17, a generated priority call is lost (S19). However, in the present exemplary embodiment, since wireless resources for priority calls are reserved, a probability that a priority call is lost may be considerably low.

In FIG. 4, other calls are assumed to be disconnected, but, in a case where a wireless resource can be secured without disconnecting other calls, base station 200 may secure a wireless resource for a priority call without disconnecting other calls. For example, base station 200 may secure a wireless resource for a priority call by delaying the communication order of other calls or lowering communication speeds of other calls.

Second reserve manager 209 may control a reserve amount on the basis of a result of counting the number of insufficient wireless resources for priority calls in S16. Insufficiency of wireless resources for priority calls with respect to an amount of generated priority calls corresponds to an actually measured blocking probability (actually measured $P_B$).

For example, in a case where actually measured $P_B$ is equal to or more than a predetermined value, second reserve manager 209 may increase a reserve amount by increasing (for example, twice) wireless resource amount $C_t$ reserved for priority calls. The predetermined value compared with actually measured $P_B$ is a value which is equal to or more than permitted blocking probability $P_B$. For example, second reserve manager 209 increases a value of $C_t$ by changing a value of permitted $P_B$ to be set when the above-described reserve amount of wireless resources is derived again. Consequently, base station 200 can reduce insufficiency of wireless resources with respect to priority calls.

For example, in a case where actually measured $P_B$ is equal to or less than the predetermined value, second reserve manager 209 may reduce a reserve amount by reducing (for example, a ham wireless resource amount $C_t$ reserved for priority calls Consequently, base station 200 can increase an amount of wireless resources which can be allocated to other calls, and can thus improve use efficiency of wireless resources.

Update such as an increase or a decrease of a reserve amount may be performed at any timing. For example, a reserve amount is updated in a case where an amount of priority calls increases, or periodically. In other words, a reserve amount is determined in a time-variant manner. Consequently, base station 200 can secure a preferable reserve amount of wireless resources at any timing.

A preferable reserve amount differs depending on an installation location of base station 200 or a generation frequency of priority calls. Thus, a reserve amount may differ for each base station 200. Each base station 200 separately manages the generation history of priority calls in the past or a blocking probability, and can thus a reserve amount of wireless resources for priority calls in autonomous and distributed manner. Therefore, base station 200 can set a reserve amount suitable for a surrounding environment of each base station 200.

In FIG. 4, an operation example of base station 200 has been described, but this is also the same for an operation example of terminal 100. In this case, regarding operation subjects, first priority call determinator 104 operates instead of second priority call determinator 208, first wireless resource allocator 105 operates instead of second wireless resource allocator 210, first wireless transmitter 107 operates instead of second wireless transmitter 212, and first transmission antenna 108 operates instead of second transmission antenna 213.

In this case, terminal 100 acquires reserve information of wireless resources for priority calls of uplink channel 21 managed by first reserve manager 214 of base station 200 and transmitted by beacon transmitter 215, by using beacon receiver 109. The reserve information includes information regarding a wireless resource reserved for a priority call of uplink channel 21 or vacancy information of the wireless resource. The acquired reserve information is stored in memory 160 before a priority call of uplink channel 21 is generated. Terminal 100 can allocate the reserved wireless resource to a priority call of uplink channel 21 on the basis of the reserve information from base station 200.

[Use Case]

Next, a description will be made of use cases applied to wireless communication system 10.

[Use Case 1]

Figure 5:
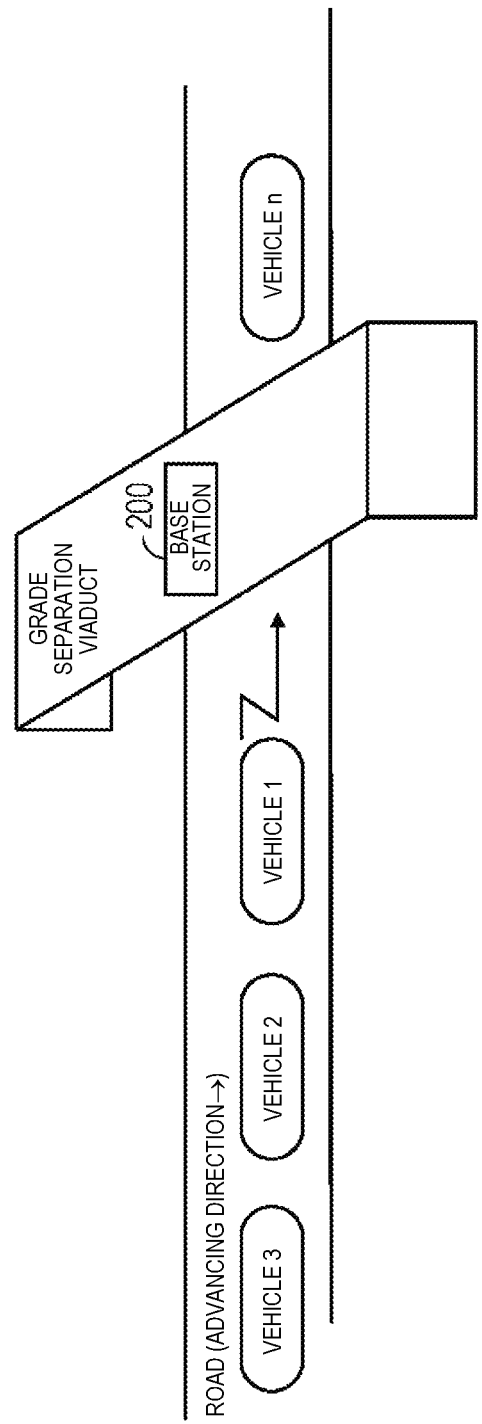
FIG. 5 is a schematic diagram for explaining a use case 1.

FIG. 5 is a schematic diagram for explaining use case 1. In use case 1, wireless communication system 10 is used to control a vehicle. In use case 1, for example, base station 200 is provided in a traffic signal, a grade separation viaduct, a pedestrian bridge, or a roadside, and terminals 100 are provided in vehicles 1 to 3 or are carried by users in vehicles 1 to 3. Herein, terminals 100 operate in conjunction with the vehicles. In use case 1, a priority call is a call for performing communication of data related to vehicle control. The data related to vehicle control includes, for example, brake operation data, data regarding a vehicle speed, or data regarding a vehicle position.

For example, if vehicle 1 is decelerated due to a brake operation, terminal 100 transmits data including the fact that the brake operation has occurred to base station 200 by using a wireless resource reserved for a priority call of uplink channel 21 of which a notification is sent from base station 200.

Base station 200 receives the data including the fact that the brake operation has occurred, and transmits data including the fact that vehicle 1 having performed the brake operation is present by using a wireless resource reserved for a priority call of downlink channel 22.

In a case where terminals 100 (for example, terminals provided in vehicles 2 and 3 following vehicle 1) enter an area in which the data transmitted from base station 200 can be received, the terminals receive the data including the fact that vehicle 1 having performed the brake operation is present. Terminals 100 control (for example, brake control) operations of vehicles 2 and 3 on the basis of the received data. Terminals 100 may display the received data (for example, data indicating that vehicle 1 has performed the brake operation) related to vehicle control on monitors in vehicles 2 and 3.

As mentioned above, wireless communication system 10 can perform communication of data regarding a brake operation in a low delay manner by using a wireless resource reserved for a priority call of uplink channel 21, and can perform communication of control data accompanying the brake operation in a low delay manner by using a wireless resource reserved for a priority call of downlink channel 22. Therefore, wireless communication system 10 can satisfy a communication request for a priority call related to vehicle control, and can thus improve the safety of vehicle traveling.

[Use Case 2]

In use case 2, wireless communication system 100 is used to detect illegality in an electronic commerce (EC) industry or a financial industry. In use case 2, for example, base station 200 is a server (server) performing a transaction process related to, for example, a financial transaction, and terminal 100 is an automated teller machine (ATM) terminal or a personal computer (PC) (hereinafter, referred to as an ATM terminal or the like) having an ATM function. In use case 2, a priority call is a call for performing communication of data related to financial transaction or electronic commerce. The financial transaction may include stock transaction.

For example, an ATM terminal or the like transmits data acquired from a card or data (hereinafter, also referred to as terminal data) acquired on the basis of an input operation from a user, to base station 200 by using a wireless resource reserved for a priority call of uplink channel 21. The terminal data includes user identification data (for example, a card number), authentication data for financial transaction, and transaction amount data.

The server detects the presence or absence of illegality in the financial transaction on the basis of the terminal data. The server transmits a detection result to the ATM terminal or the like by using a wireless resource reserved for a priority call of downlink channel 22.

The ATM terminal or the like receives data regarding the detection result of the presence or absence of illegal transaction, and stops the financial transaction in a case where there is illegality. Consequently, wireless communication system 10 can perform communication between the ATM terminal or the like and the server in a low delay manner, can satisfy a communication request for a priority call related to financial transaction, and can thus suppress illegal financial transaction.

A PC may transmit terminal data including data related to electronic commerce (for example, purchase of a commodity) to the server, and the server may detect the presence or absence of illegality in the electronic commerce on the basis of the terminal data. The server may transmit the detection result to the PC, and the PC may stop the electronic commerce on the basis of the received detection result.

Consequently, wireless communication system 10 can safely perform electronic commerce related to mass purchase of the same commodity or simultaneous purchase from separate locations by the same user by suppressing the hindrance to a high-speed process in the electronic commerce.

[Use Case 3]

In use case 3, wireless communication system 10 is used to perform a notification of the occurrence of a disaster. In use case 3, for example, base station 200 is provided in a sensing target area (for example, around a volcano) using a sensor. Terminal 100 is provided in a center (for example, a facility such as a police station, a fire station, or an inn) or an apparatus (for example, an alarm) collecting sensing data, or is carried by a user (for example, a security guard) referring to the sensing data. Terminal 100 can operate in conjunction with various apparatuses (for example, an alarm or an electronic shutter). The sensing data includes, for example, smoke detection data. In use case 3, a priority call is a call for performing a notification of the occurrence of a disaster.

For example, base station 200 acquires smoke detection data from the sensor as external device 400. Base station 200 transmits data including the fact that smoke has been detected, by using a wireless resource reserved for a priority call of downlink channel 22.

Terminal 100 receives the data including the fact that smoke has been detected, and can thus notify a user of the occurrence of smoke, for example, in conjunction with an alarm. Therefore, for example, in a case where smoke is detected by the sensor, terminal 100 can close a shutter in conjunction with the shutter in order to suppress spreading of a fire. For example, base station 200 uses smoke detection data as volcanic eruption symptom data, and notifies terminal 100 of the volcanic eruption symptom data. Therefore, it is possible to rapidly notify a user of data related to a volcanic eruption and thus to improve the safety around the volcano.

As mentioned above, in base station 200 treating traffic information, base station 200 treating financial information, and base station 200 treating disaster information, it is determined whether data is to be transmitted to host device 300 side or a subordinate device (for example, terminal 100) side in consideration of applications using the data. In this case, these applications include, for example, a vehicle control application, a financial transaction application, and a disaster notification application. Wireless communication system 10 can reduce a communication delay time without transmitting data to host device 300.

[Effects and the Like]

As mentioned above, in wireless communication system 10, base station 200 reserves a predetermined amount of wireless resources specifically to priority calls. Consequently, in a case where a priority call is generated, it is possible to reduce a probability that a wireless resource allocated by base station 200 is not present or is not vacant (blocking probability). Consequently, base station 200 can increase a possibility that an actually measured blocking probability (actually measured $P_B$) can be reduced to a permitted blocking probability (permitted $P_B$) or less.

Base station 200 derives a reserve amount of wireless resources on the basis of a generation amount of priority calls generated in a predetermined period in the past or a probability distribution of the generation amount of priority calls A reserve amount of wireless resources is derived, for example, for each base station 200. Base station 200 may determine a reserve amount of wireless resources separately for each of uplink channel 21 and downlink channel 22, and may reserve wireless resources. Base station 200 may temporally change a reserve amount of wireless resources.

Base station 200 may manage and update the occurrence of a priority call as history, and may set a reserve amount of wireless resources in which an actually measured blocking probability is equal to or less than a permitted blocking probability in a case where a situation continues in which the same priority call is generated. Consequently, base station 200 can reduce a probability that a reserve amount of wireless resources is too large or too small, and can thus improve use efficiency of wireless resources by suppressing insufficiency of wireless resources for priority calls Base station 200 can reduce a communication delay time by suppressing insufficiency of wireless resources for priority calls, and can thus improve quality of service (QoS).

It is expected that 5G is also used for an application requiring data transmission in a lower delay time. For example, 5G may be used for uploading of vehicle operation information (information regarding pressing of a brake or rotation of a steering wheel) in safe driving assistance or downloading of control information (information regarding applying of automatic braking or applying of automatic steering). The operation information or the control information of a vehicle is included in priority data, and is thus transmitted and received with a priority call.

Even if the low delay time performance as a wireless standard is provided to satisfy a low delay time, in a case where a wireless resource allocated to wireless communication between terminal 100 and base station 200 is occupied by another call connected to base station 200 when a priority call is generated, the priority call is lost.

In contrast, according to terminal 100, base station 200, or wireless communication system 10 of the present exemplary embodiment, wireless resources reserved in a preferable reserve amount can be allocated to priority calls, and thus it is possible to prevent a priority call from being lost. Similarly, base station 200 can reduce a possibility that communication of other calls is disconnected in order to allocate a wireless resource to a generated priority call, and can thus suppress deterioration in communication quality of other calls.

Since base station 200 collectively manages wireless resources used for priority calls of uplink channel 21, respective terminals 100 may not cooperate with each other in order to allocate wireless resources, and thus it is possible to efficiently allocate wireless resources.

Second Exemplary Embodiment

In the first exemplary embodiment, an example has been described in which the wireless communication system includes a single base station or a plurality of separate base stations (which do not cooperate with each other). In the second exemplary embodiment, a description will be made of an example in which a wireless communication system includes a plurality of base stations, and the plurality of base stations cooperate with each other. In the second exemplary embodiment, a description of the same content as that in the first exemplary embodiment will be omitted or will be made briefly.

[Configuration and the Like]

[Configuration of Wireless Communication System]

Figure 6:
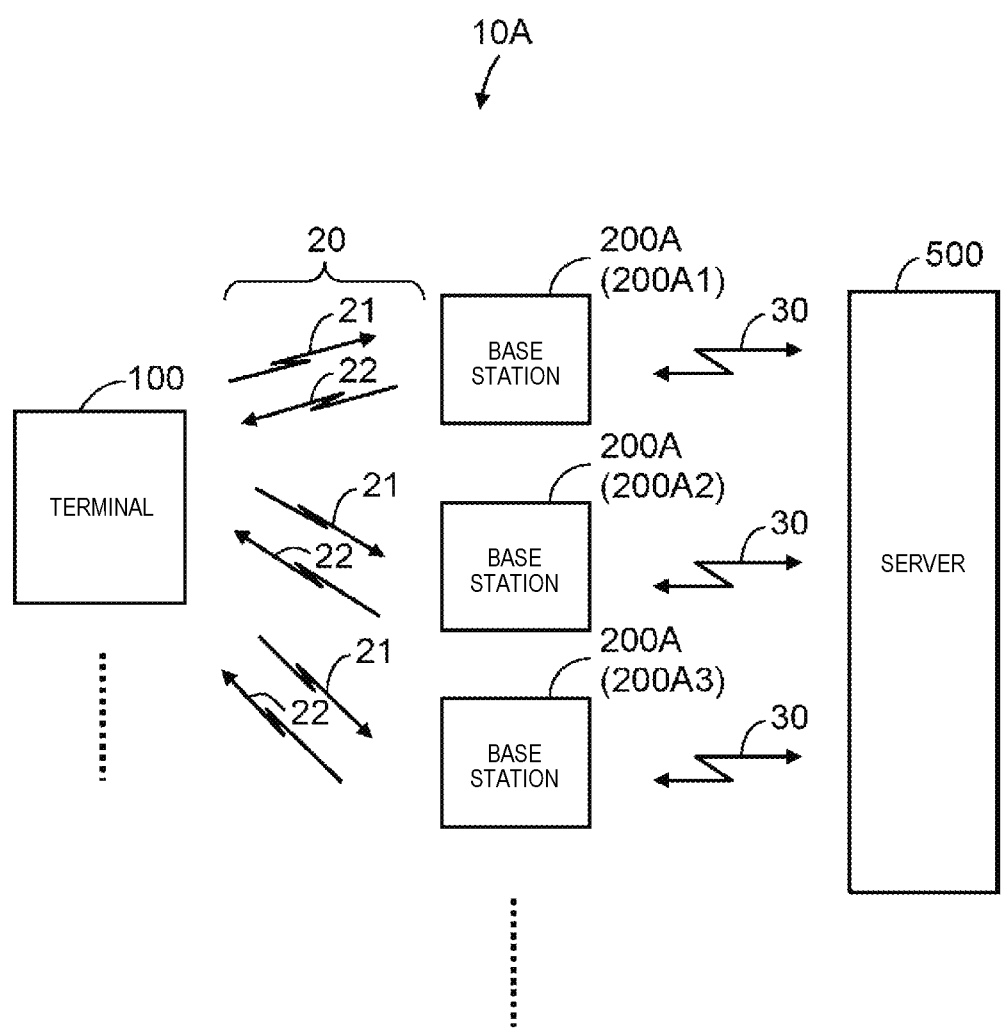
FIG. 6 is a block diagram illustrating a configuration example of a wireless communication system in a second exemplary embodiment.

FIG. 6 is a block diagram illustrating a configuration example of wireless communication system 10A in the second exemplary embodiment. Wireless communication system 10A includes one or more terminals 100, a plurality of base stations 200A, and server 500. Wireless communication system 10A is, for example, a wireless communication system of 5G. Terminal 100 and base station 200A are connected to each other via radio channels 20. Base station 200A and server 500 are connected to each other via, for example, optical channels 30. Wired channels may be provided, and radio channels may be provided, instead of optical channels 30.

The plurality of base stations 200A are disposed so that cover areas of the respective base stations overlay each other. Thus, the plurality of base station 200A are provided to be close to each other, and can thus be involved in allocation of wireless resources in other base stations (cells). Respective cell diameters of the plurality of base stations 200A may or not be the same as each other. The number of a plurality of base stations 200A disposed to overlay each other may be three or four, and may be units of ten. The plurality of base stations 200A are controlled by server 500, and can thus accommodate wireless resources to each other. In the present exemplary embodiment, terminal 100 can perform communication with respective base stations 200A disposed to overlay each other.

Data transmitted with radio channels 20 is priority data or the like, and is the same as in the first exemplary embodiment.

Configurations of Base Station and Server

Figure 7:
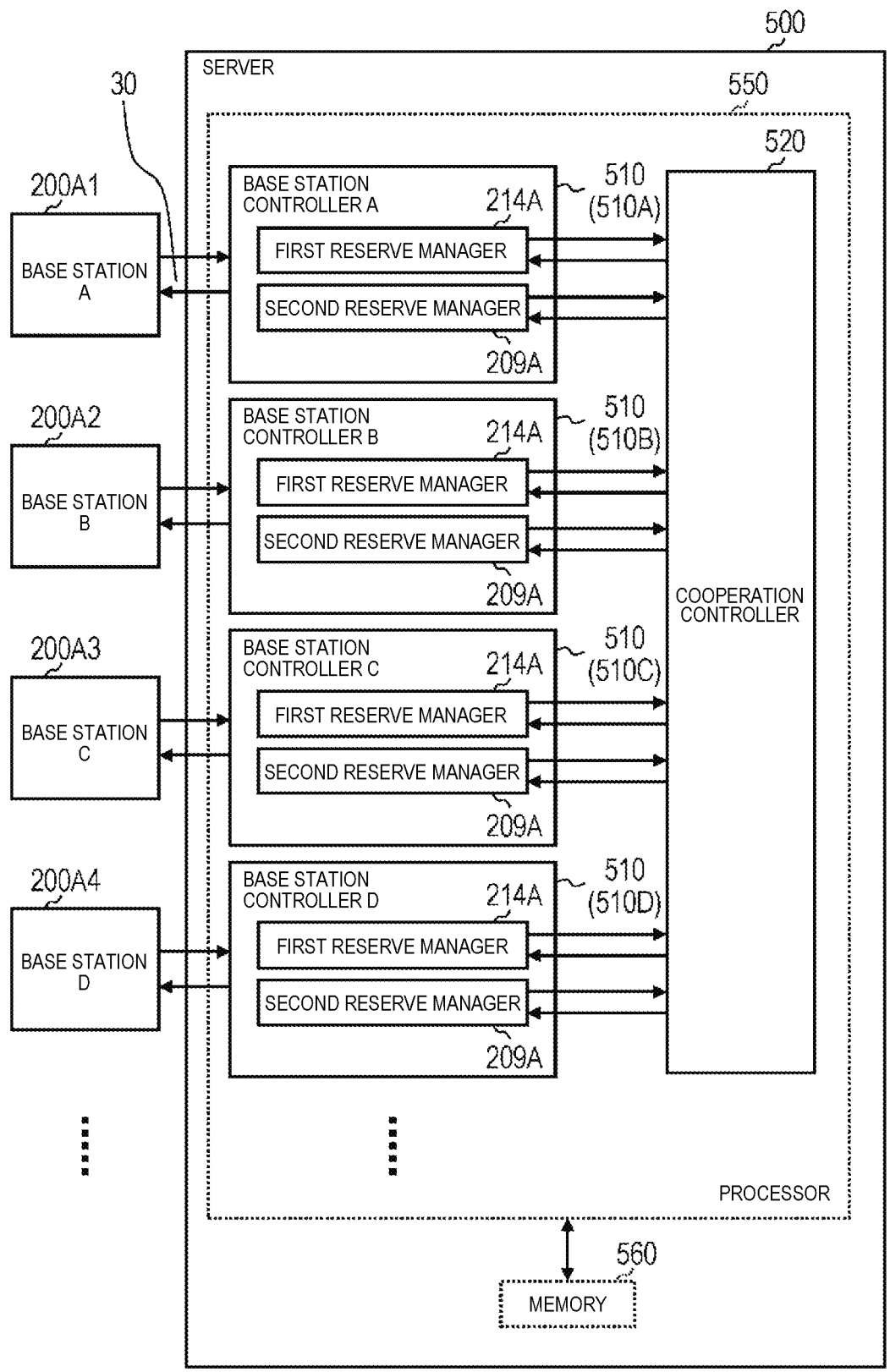
FIG. 7 is a block diagram illustrating a configuration example of a base station and a server in the second exemplary embodiment.

FIG. 7 is a block diagram illustrating a configuration example of base station 200A and server 500. In FIG. 7, base stations 200A include four base stations 200A1, 200A2, 200A3 and 200A4. The number of base stations 200A is not limited thereto.

Figure 8:
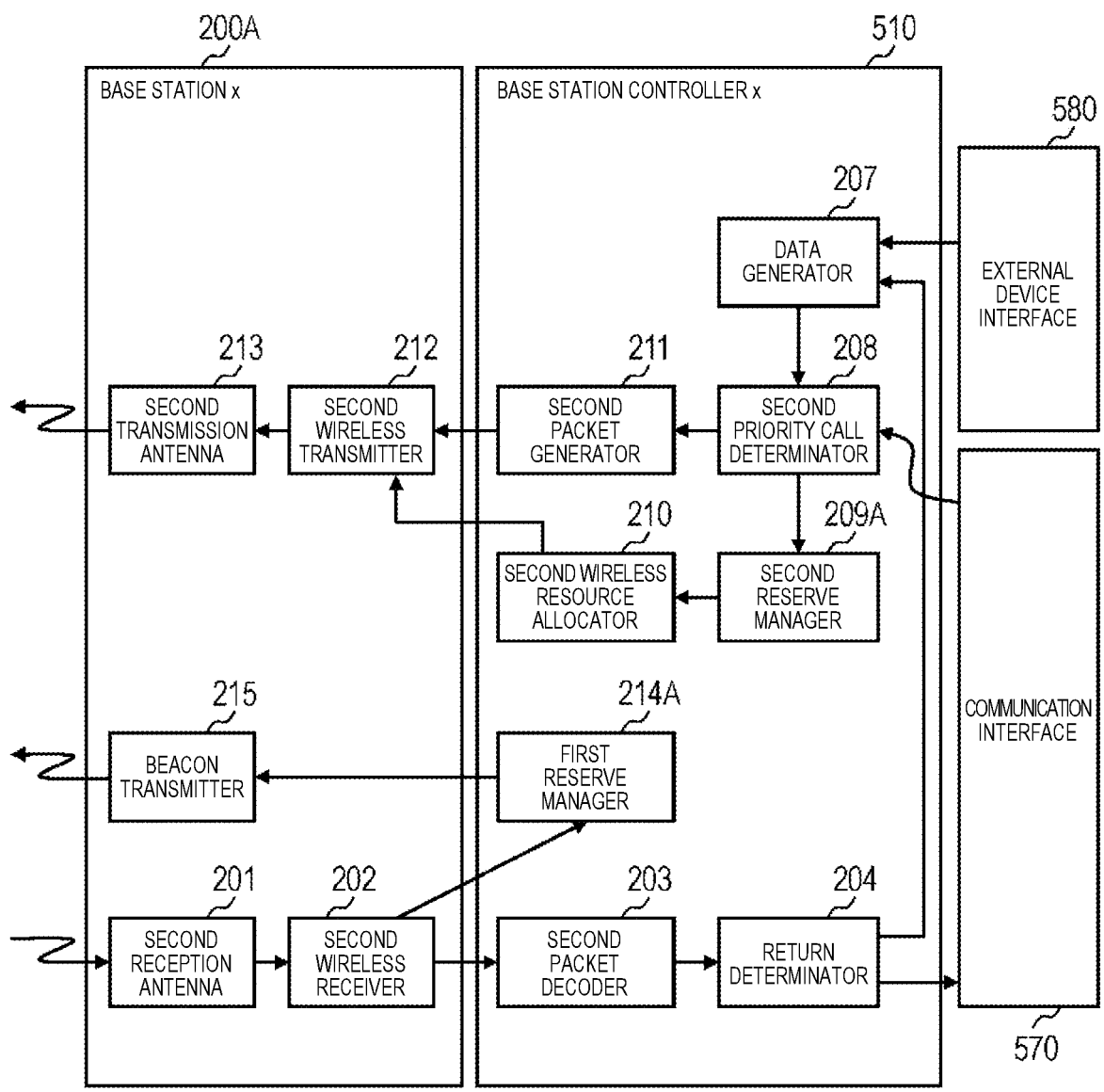
FIG. 8 is a block diagram illustrating a first configuration example of the base station and a base station controller of the server in the second exemplary embodiment.
Figure 9:
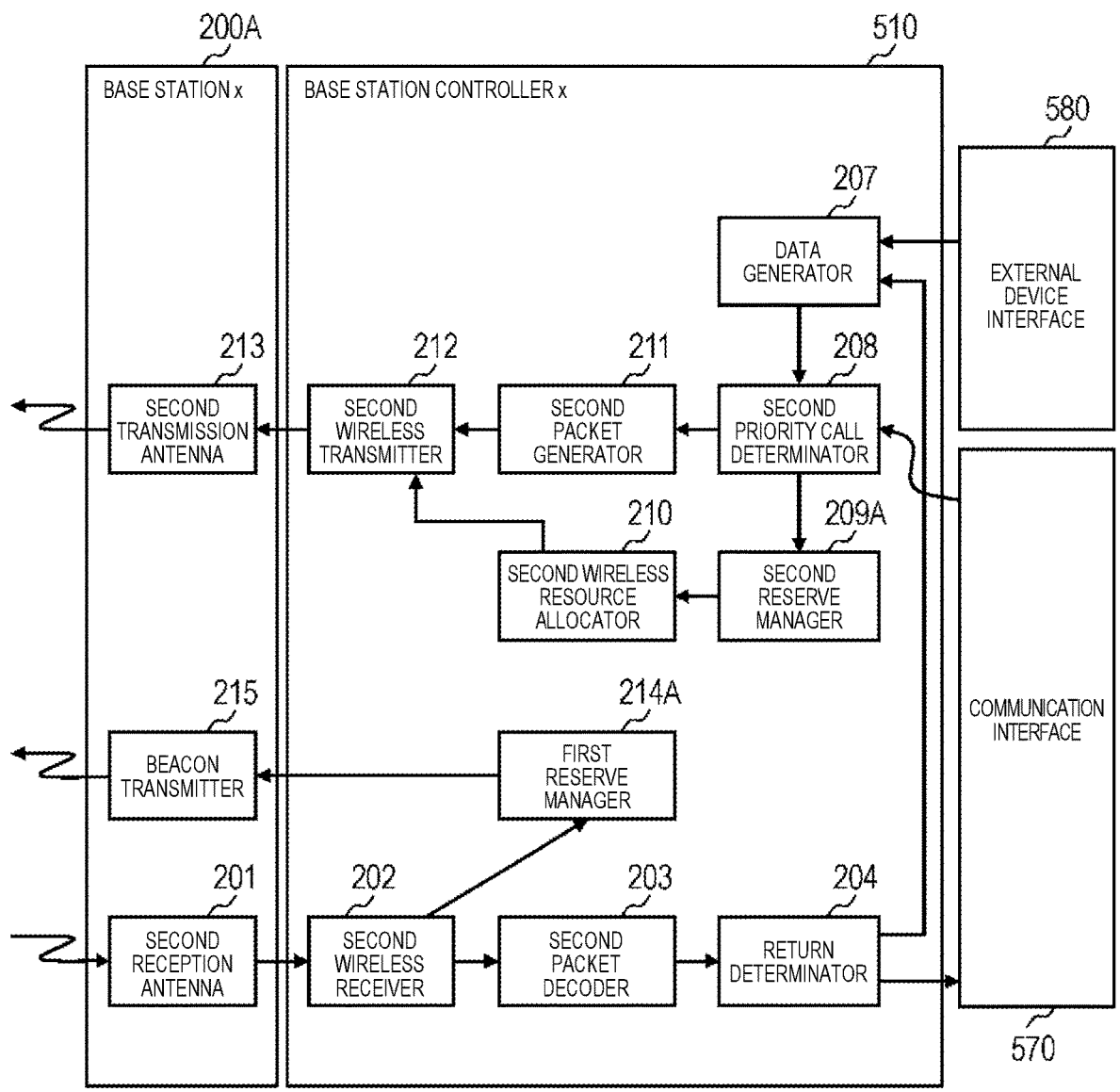
FIG. 9 is a block diagram illustrating a second configuration example of the base station and a base station controller of the server in the second exemplary embodiment.

Server 500 includes processor 550, memory 560, communication interface 570 (first communication interface), and external device interface 580. Communication interface 570 and external device interface 580 are not illustrated in FIG. 7, and are illustrated in FIGS. 8 and 9.

Processor 550 performs various processes or control in cooperation with memory 560. Specifically, processor 550 executes a program stored in memory 560 so as to realize functions of base station controller 510 and cooperation controller 520.

Memory 560 stores, for example, various pieces of data, pieces of information, and programs. Memory 560 may be built into processor 550. Memory 560 may include a secondary storage device along with a primary storage device. The primary storage device includes, for example, a RAM and a ROM. The secondary storage device includes, for example, an HDD and an SSD.

Memory 560 stores the same data as data stored in memory 260 described in the first exemplary embodiment. For example, memory 560 stores information related to reserve of a wireless resource used for communication between each of base stations 200A and terminal 100. The information related to reserve of a wireless resource is stored in memory 560 in a differentiated manner for each base station 200A, for example. The information related to reserve of a wireless resource may be stored in memory 560 in a differentiated manner for uplink channel 21 and downlink channel 22.

Memory 560 stores information regarding communication records of each base station 200A. The information regarding communication records includes, for example, information related to QCI parameters which will be described later. The information regarding communication records includes, for example, the name of a service having been provided through communication of a priority call, a record value of a delay time (a mean value, the maximum value, or the like) or a PER (a mean value, the maximum value, or the like) related to communication of the priority call in the service, and the presence or absence of band guarantee in communication of the priority call in the service. A service here may be an application.

Communication interface 570 is the same as communication interface 205 described in the first exemplary embodiment, and performs communication with host device 300. A communication method in communication interface 570 is, for example, a wired (for example, an optical channel) or wireless 5G communication method.

For example, communication interface 570 transmits data (for example, non-priority data) in uplink channel 21 to host device 300, and receives data (for example, non-priority data) in downlink channel 22 from host device 300. Communication interface 570 may return data to terminal 100 via base station 200A, and may also transmit data of uplink channel 21 to host device 300, even in a case of a priority call.

External device interface 580, which is the same as external device interface 206 described in the first exemplary embodiment, is connected to external device 400, and acquires (receives, for example) data from external device 400. A communication method in external device interface 580 includes, for example, DECT, Bluetooth (registered trademark), various wired communication method, and various wireless communication methods.

Although not illustrated, server 500 includes, for example, communication interfaces (second communication interfaces) of the same number as the number of base stations 200A (four in FIG. 7). The second communication interfaces are connected to optical channel 30 connected to base stations 200A, and perform communication with respective base stations 200A. The number of second communication interfaces is not limited thereto. A single second communication interface may be provided, and the single communication interface may perform communication with respective base stations 200A.

Base station controller 510 includes, for example, base station controllers 510 (in FIG. 7, four base station controllers 510A, 510B, 510C and 510D) of the same number as the number of base stations 200A. The number of base station controllers 510 is not limited thereto.

Base station controller 510 has some of the functions of the respective units of base station 200 described in the first exemplary embodiment. In FIG. 7, base station controller 510 includes first reserve manager 214A and second reserve manager 209A, and blocks other than the reserve managers are not illustrated. Portions other than the reserve managers are illustrated in FIG. 8 or FIG. 9.

Cooperation controller 520 operates in cooperation with first reserve manager 214A or second reserve manager 209A of each base station controller 510.

FIG. 8 is a block diagram illustrating a first configuration example of base station 200A and base station controller 510. In base station 200A illustrated in FIG. 8, the same constituent elements as those of base station 200 illustrated in FIG. 3 are given the same reference numerals, and description thereof will be omitted or will be made briefly.

In FIG. 8, "base station x" indicates any one of base stations A, B, C, D, . . . . "Base station controller x" indicates any one of base station controllers A, B, C, D, . . . .

Base station 200A includes second reception antenna 201, second wireless receiver 202, second wireless transmitter 212, second transmission antenna 213, and beacon transmitter 215.

In server 500, base station controller 510 includes second packet decoder 203, return determinator 204, data generator 207, second priority call determinator 208, second reserve manager 209A, second wireless resource allocator 210, second packet generator 211, and first reserve manager 214A.

In other words, base station 200A includes the antenna and the peripheral constituent elements required for the above-described base station 200 to perform communication. The constituent elements of base station 200A treats a lower layer (for example, a first layer or a second layer) of an OSI reference model compared with base station controller 510.

Base station controller 510 includes the constituent elements realizing control or a function required for above-described base station 200 to perform communication. The constituent elements of base station controller 510 treat a higher layer (for example, a third layer or higher) of the OSI reference model compared with base station 200A.

FIG. 9 is a block diagram illustrating a second configuration example of base station 200A and base station controller 510. In base station 200A illustrated in FIG. 9, the same constituent elements as those of base station 200 illustrated in FIG. 3 are given the same reference numerals, and description thereof will be omitted or will be made briefly.

Base station 200A includes second reception antenna 201, second transmission antenna 213, and beacon transmitter 215.

In server 500, base station controller 510 includes second wireless receiver 202, second packet decoder 203, return determinator 204, data generator 207, second priority call determinator 208, second reserve manager 209A, second wireless resource allocator 210, second packet generator 211, second wireless transmitter 212, and first reserve manager 214A.

Second wireless receiver 202 and second wireless transmitter 212 perform signal processing related to radio frequency (RF).

In other words, base station 200A includes the antenna required for above-described base station 200 to perform communication. The constituent elements of base station 200A treats a lower layer (for example, a first layer) of the OSI reference model compared with base station controller 510.

Base station controller 510 includes the constituent elements realizing control or a function required for above-described base station 200 to perform communication. The constituent elements of base station controller 510 treat a higher layer (for example, a second layer or higher) of the OSI reference model compared with base station 200A.

Second reserve manager 209A has the function of second reserve manager 209 illustrated in FIG. 3.

Second reserve manager 209A allocates, to a priority call of downlink channel 22 generated in the own state, a wireless resource for a priority call for the own station stored in memory 560 in advance or a vacant wireless resource among other wireless resources for the own station. The own station is base station 200A (for example, base station 200A1) including second reserve manager 209A. In a case where a wireless resource for a priority call for the own station stored in memory 560 in advance or a vacant wireless resource among other wireless resources for the own station is not present, second reserve manager 209A notifies cooperation controller 520 that insufficiency of a wireless resource occurs. The notification that insufficiency of a wireless resource occurs includes, for example, a base station ID for identifying the own station, and an amount of insufficient wireless resources.

Second reserve manager 209A acquires information regarding wireless resources for priority calls for other stations or a vacant wireless resource among the wireless resources for other stations from cooperation controller 520, and allocates at least some of the acquired wireless resources. The other stations are base stations 200A (for example, base station 200A4) other than base station 200A including second reserve manager 209A.

Second reserve manager 209A notifies base station 200A (for example, base station 200A1) corresponding to base station controller 510 of information regarding an allocated wireless resource via the communication interface (not illustrated). Second transmission antenna 213 of base station 200A transmits data regarding the priority call by using the allocated wireless resource.

In the same manner as in the first exemplary embodiment, second reserve manager 209A derives a reserve amount of wireless resources for priority calls. In the present exemplary embodiment, values (for example, values used in (Equation 1) to (Equation 7)) of parameters for deriving a reserve amount are determined for each base station 200A, and thus a reserve amount is derived.

First reserve manager 214A has the function of first reserve manager 214 illustrated in FIG. 3.

First reserve manager 214A allocates, to a priority call of uplink channel 21 generated in the own state, a wireless resource for a priority call for the own station stored in memory 560 in advance or a vacant wireless resource among other wireless resources for the own station. In a case where a wireless resource for a priority call for the own station stored in memory 560 in advance or a vacant wireless resource among other wireless resources for the own station is not present, first reserve manager 214A notifies cooperation controller 520 that insufficiency of a wireless resource occurs. The notification that insufficiency of a wireless resource occurs includes, for example, a base station ID for identifying the own station, and an amount of insufficient wireless resources.

First reserve manager 214A acquires information regarding wireless resources for priority calls for other stations or a vacant wireless resource among the wireless resources for other stations from cooperation controller 520, and allocates at least some of the acquired wireless resources.

First reserve manager 214A notifies base station 200A (for example, base station 200A1) corresponding to base station controller 510 of information regarding an allocated wireless resource via the communication interface (not illustrated). Second reception antenna 201 of base station 200A receives data regarding the priority call by using the allocated wireless resource.

In the same manner as in the first exemplary embodiment, first reserve manager 214A derives a reserve amount of wireless resources for priority calls. In the present exemplary embodiment, values (for example, values used in (Equation 1) to (Equation 7)) of parameters for deriving a reserve amount are determined for each base station 200A, and thus a reserve amount is derived.

Cooperation controller 520 cooperates with first reserve manager 214A and second reserve manager 209 of each base station 200A, and performs adjustment so that a vacant wireless resource for a priority call is allocated to base station 200A in which a wireless resource for a priority call is insufficient among the plurality of base stations 200A. In other words, cooperation controller 520 causes the plurality of base stations 200A to accommodate wireless resources for priority calls to each other. For example, in a case where a notification that insufficiency of a wireless resource occurs is received from second reserve manager 209A or first reserve manager 214A, cooperation controller 520 adjusts wireless resources for priority calls among the plurality of base stations 200A.

For example, it is assumed that a wireless resource for a priority call is insufficient when certain base station 200A (for example, base station 200A1) (also referred to as a request base station) performs communication with terminal 100. In other words, the request base station is a base station requesting a vacant wireless resource to be provided. In this case, cooperation controller 520 refers to, for example, memory 560, and determines a situation in which reserved wireless resources for priority calls are vacant in other base stations 200A.

Cooperation controller 520 selects base station 200A (for example, base station 200A4) (also referred to as a providing base station) which satisfies a predetermined condition (for example, any of conditions (1) to (5) which will be described later) and in which wireless resources for priority calls are vacant, from among one or more other base stations 200A.

In other words, the providing base station is base station 200A providing a vacant wireless resource to the request base station. Cooperation controller 520 notifies the request base station of information regarding at least some vacant wireless resources reserved in the providing base station. Consequently, the request base station can additionally secure wireless resources for priority calls.

In a case where a vacant wireless resource is adjusted among the plurality of base stations 200A, cooperation controller 520 may select a providing base station according to service quality of each base station 200A. The service quality here includes, for example, the type of data regarding a priority call treated in each base station 200A, the service content, and an allowable communication delay time (for example, 1 msec).

Consequently, for example, in a case where treated data differs depending on an installation location of base station 200A, server 500 may select a more appropriate providing base station according to characteristics of a request base station (for example, the request base station is base station 200A provided near a highway, and an amount f brake control data is large).

Cooperation controller 520 may select a providing base station, for example, by using a quality of service (QoS) class identifier (QCI) as service quality. The QCI is started by 3GPP, and is an indicator in a case where a plurality of request index for a service are divided into classes. The QCI includes a plurality of parameters.

FIG. 10 is a schematic diagram illustrating detailed examples of QCI parameters.

The QCI parameters include, for example, a QCI identification number, a resource type, the priority, an allowable delay time, an allowable packet error rate (PER), and information regarding a service name. The resource type includes information regarding a guaranteed bit rate (GBR) and Non-GBR, and indicates the presence or absence of band guarantee. In other words, a band is guaranteed in the GBR, and a band is not guaranteed in the Non-GBR.

Base station 200A acquires information regarding the QCI from terminal 100. Server 500 acquires information regarding the QCI from base station 200A via the communication interface (not illustrated). Cooperation controller 520 of server 500 selects a providing base station according to, for example, any one of the following conditions (1) to (5) on the basis of the acquired QCI.

(1) Cooperation controller 520 may acquire a service name of a priority call included in the acquired QCI and treated by a request base station. Cooperation controller 520 may refer to communication records of each base station 200A stored in memory 560, and may select, as a providing base station, base station 200A in which traffic with the same service name as the acquired service name occurs a predetermined number of times or more (for example, the largest number of times) and which has a vacant wireless resource.

In a case of (1), server 500 can expect that a request base station can perform communication at the same service quality as that of a providing base station providing a service with the same service name.

(2) Cooperation controller 520 acquires both of an allowable delay time (request index) and an allowable PER (request index) of a priority call included in the acquired QCI and treated by a request base station. Cooperation controller 520 may refer to communication records of each base station 200A stored in memory 560, and may select, as a providing base station, base station 200A in which traffic with an allowable delay time and an allowable PER which are equal to or less than both of the acquired request indexes occurs a predetermined number of times or more (for example, the largest number of times) and which has a vacant wireless resource.

In a case of (2), server 500 can expect that a request base station can perform communication in the same delay time as a delay time which is equal to or less than an allowable delay time when during communication based on a providing base station and at the same PER as a PER which is equal to or less than an allowable PER during communication based on the providing base station.

(3) Cooperation controller 520 acquires an allowable delay time (request index) of a priority call included in the acquired QCI and treated by a request base station. Cooperation controller 520 may refer to communication records of each base station 200A stored in memory 560, and may select, as a providing base station, base station 200A in which traffic with an allowable delay time which is equal to or less than the acquired request index occurs a predetermined number of times or more (for example, the largest number of times) and which has a vacant wireless resource.

In a case of (3), server 500 can expect that a request base station can perform communication in the same delay time as a delay time which is equal to or less than an allowable delay time when during communication based on a providing base station.

(4) Cooperation controller 520 acquires an allowable PER (request index) of a priority call included in the acquired QCI and treated by a request base station. Cooperation controller 520 may refer to communication records of each base station 200A stored in memory 560, and may select, as a providing base station, base station 200A in which traffic with an allowable PER which are equal to or less than both of the acquired request indexes occurs a predetermined number of times or more (for example, the largest number of times) and which has a vacant wireless resource.

In a case of (4), server 500 can expect that a request base station can perform communication at the same PER as a PER which is equal to or less than an allowable PER during communication based on the providing base station.

(5) Cooperation controller 520 acquires a resource type of a priority call included in the acquired QCI and treated by a request base station. Cooperation controller 520 may refer to communication records of each base station 200A stored in memory 560, and may select, as a providing base station, base station 200A in which traffic with the same resource type as the acquired resource type occurs a predetermined number of times or more (for example, the largest number of times) and which has a vacant wireless resource.

In a case of (5), server 500 can expect that a request base station can perform communication at the same service quality as that of a providing base station guaranteeing a band or a providing base station not guaranteeing a band.

For example, cooperation controller 520 may first determine whether or not the condition (1) is satisfied, and may determine whether or not the conditions (2) to (5) are satisfied in this order in a case where the condition (1) is not satisfied. In a case where none of the conditions (1) to (5) are satisfied, cooperation controller 520 may select any base station 200A having a vacant wireless resource as a providing base station.

For example, cooperation controller 520 may store which of the conditions (1) to (5) is determined as a determination condition in memory 560 in advance, and may select a providing base station according to this determination condition.

Cooperation controller 520 may directly inquire of each base station controller 510A which is not notified of insufficiency of a wireless resource for a priority call about information regarding the QCI. In a case where communication matching any parameter (for example, a resource type or a service name) of the acquired QCI is being performed, cooperation controller 520 may select base station 200A performing the communication as a providing base station. In a case where communication satisfying any parameter (for example, an allowable delay time or an allowable PER) of the acquired QCI is being performed, cooperation controller 520 may select base station 200A performing the communication as a providing base station.

Since wireless resources are accommodated among a plurality of base stations 200A by cooperation controller 520, server 500 can secure quality of experience (QoE) according to the service content of a priority call treated by base station 200A.

[Operation and the Like]

Next, a description will be made of an operation example of wireless communication system 10A.

Figure 11:
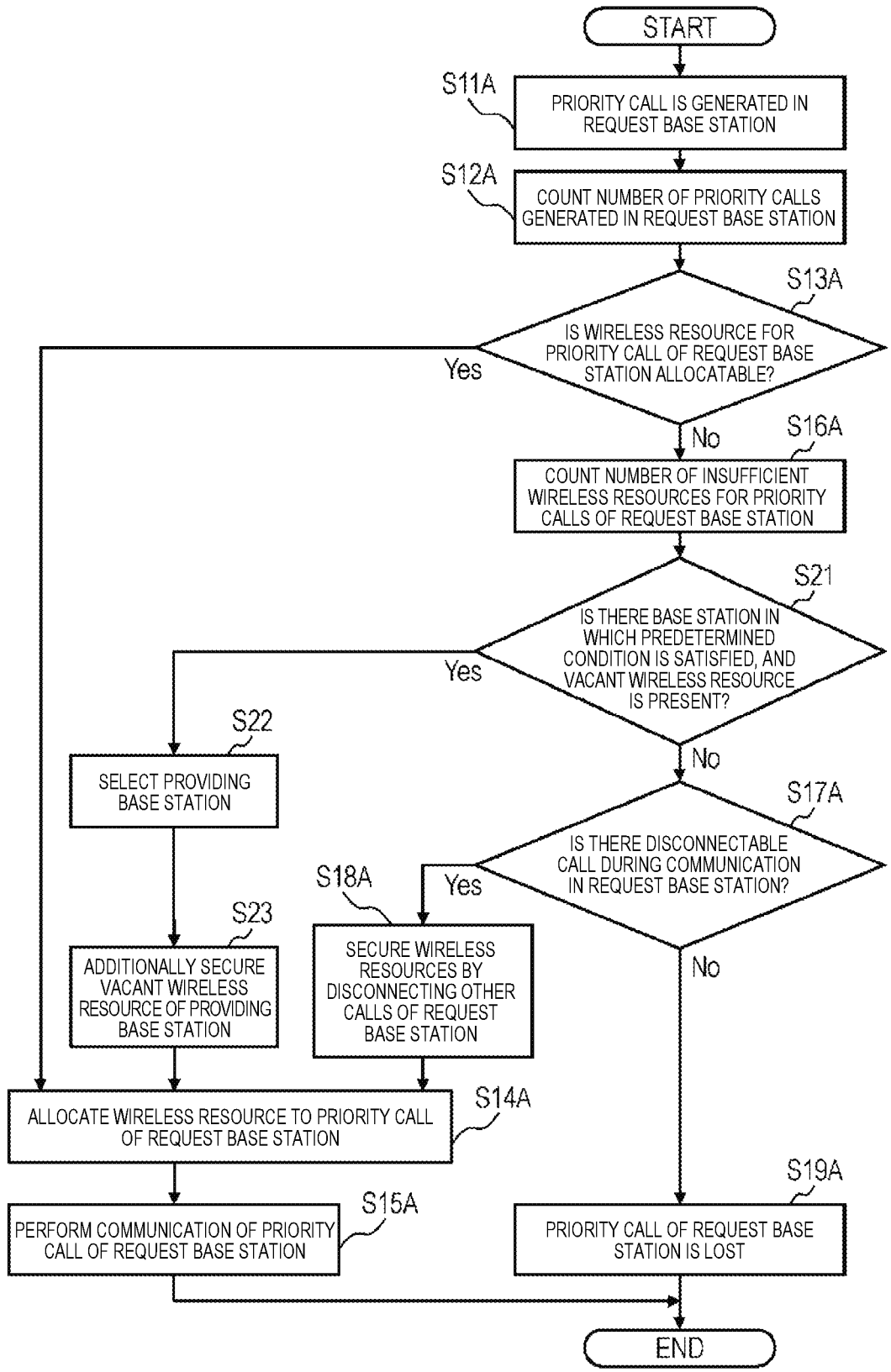
FIG. 11 is a flowchart illustrating an operation example of the server in the second exemplary embodiment.

FIG. 11 is a flowchart illustrating an operation example of server 500. In FIG. 11, the same process as the process illustrated in FIG. 4 is given the same reference sign, and a description thereof will be omitted or will be made briefly. FIG. 11 illustrates an example in which a request base station is base station 200A1, and a providing base station is base station 200A4.

First, second priority call determinator 208 of certain base station controller 510 (for example, base station controller 510A corresponding to base station 200A1) determines whether or not a priority call of downlink channel 22 is generated in certain base station 200A (for example, base station 200A1) (S11A).

If it is determined that a priority call of downlink channel 22 is generated in base station 200A1, second reserve manager 209A of base station controller 510A counts the number of priority calls generated in base station 200A1 (S12A), and stores a count value in memory 560. The count value of the number of priority calls generated in base station 200A1 is used to derive a reserve amount of wireless resources in base station 200A1.

Second wireless resource allocator 210 of base station controller 510A refers to wireless resources reserved for priority calls of downlink channel 22 in base station 200A1, stored in memory 560, and determines whether or not a wireless resource can be allocated to the priority call generated in base station 200A1 (S13A).

Next, in a case where there is no vacant wireless resource among the wireless resources reserved for priority calls of downlink channel 22 in base station 200A1, second wireless resource allocator 210 of base station 200A1 may allocate a wireless resource which is not reserved in base station 200A1.

In a case where a wireless resource of base station 200A1 can be allocated to the priority call of base station 200A1, second wireless resource allocator 210 of base station controller 510A allocates the wireless resource to the priority call of base station 200A1 (S14A).

Second wireless transmitter 212 of base station controller 510A sends a notification to base station 200A1 such that a transmission packet of the priority call is transmitted, by using the allocated wireless resource via the communication interface (not illustrated). Base station 200A1 transmits the transmission packet of the priority call to terminal 100 or the like by using the allocated wireless resource on the basis of the notification from base station controller 510A (S15A).

In a case where a wireless resource of base station 200A1 cannot be allocated to the priority call of base station 200A1 in S13A, second reserve manager 209 of base station controller 510A counts the number of insufficient wireless resources for priority calls (S16A).

Second reserve manager 209 of base station controller 510A sends information indicating that wireless resources for priority calls of base station 200A1 are insufficient to cooperation controller 520.

Cooperation controller 520 receives the information indicating that wireless resources for priority calls of base station 200A1 are insufficient, and determines whether or not there is base station 200A which satisfies a predetermined condition (for example, the above-described conditions (1) to (5)) and has a vacant wireless resource among other base stations 200A (for example, base stations 200A2 to 200A4) (S21).

Cooperation controller 520 selects, as a providing base station, base station 200A (for example, base station 200A4) which has a vacant wireless resource and satisfies a predetermined condition among other base stations 200A (S22).

Cooperation controller 520 secures the vacant wireless resource of base station 200A4 as the selected providing base station, as a wireless resource of base station 200A1 as a request base station (S23). In this case, cooperation controller 520 stores information regarding the new wireless resource secured for base station 200A1 in memory 560 (S23). Cooperation controller 520 notifies second reserve manager 209A of base station controller 510A of the information regarding the new wireless resource secured for base station 200A1.

If the new wireless resource for base station 200A1 is secured, server 500 performs the processes in S14A and S15A.

In a case where there is no vacant wireless resource in other base stations 200A in S21, second wireless resource allocator 210 of base station controller 510A determines whether or not there is a disconnectable call among other calls treated by base station 200A1 (S17A).

In a case where there is another call which is disconnectable, second wireless resource allocator 210 of base station controller 510A disconnects another call (S18A). Base station 200A1 disconnects another call in base station 200A1, and can thus secure a wireless resource for the priority call generated in base station 200A1.

If another call in base station 200A1 is disconnected, server 500 performs the processes in S14 and S15.

In a case where another call which is disconnectable is not present in base station 200A1 in S17A, the priority call generated in base station 200A1 is lost (S19A). However, in the present exemplary embodiment, a wireless resource for a priority call of base station 200A1 is reserved, and wireless resources is accommodated from other base stations 200A. Therefore, there may be a considerably low probability that a priority call is lost.

[Effects and the Like]

As mentioned above, according to wireless communication system 10A of the present exemplary embodiment, the same effects as those in wireless communication system 10 of the first exemplary embodiment are achieved. In wireless communication system 10A, server 500 treats (cooperates) a plurality of base station 200A as one by using a virtualization technique, and controls the base stations, so that vacant wireless resources are accommodated among the plurality of base stations 200A. If there are vacant wireless resources in other base stations 200A, server 500 additionally secures the wireless resources as wireless resources for base station 200A in which wireless resources are insufficient. Wireless communication system 10A can integrate digital processes such as output control performed by respective base stations 200A into a virtual machine by using the virtualization technique, and can perform the digital processes integrally and flexibly.

Cooperation controller 520 adjusts allocation of a wireless resource for a priority call among the plurality of base stations 200A. Therefore, when viewed from terminal 100, base stations 200A as communication destinations are viewed as one, and thus terminal 100 is not aware of which base station 200A is a providing base station. Therefore, a load on a user of terminal 100 is not increased.

In the future, it is expected that the types of data treated as traffic will be separated for each base station 200A. For example, base station 200A provided at a position close to an intersection treats a large volume of vehicle control data (for example, brake control data), and thus there is a probability that the number of priority calls may increase. Base station 200A provided at a position close to a commercial facility treats a large volume of video data or music data, and thus there is a probability that the number of priority calls may decrease. Therefore, a service mainly treated by base station 200A or an application for providing the service is divided according to an installation location of each base station 200 over time. On the other hand, an allowable delay time or an allowable PER differs depending on the content of a service or an application.

In contrast, since server 500 selects a providing base station on the basis of an acquired QCI, a request base station can acquire a wireless resource having a high possibility that the same service, application, and request quality as those of the providing base station can be satisfied. Therefore, server 500 can supply an insufficient wireless resource for a priority call and can also suppress deterioration in communication quality.

The use cases described in the first exemplary embodiment may be regarded as use cases of the second exemplary embodiment. As a use case of the second exemplary embodiment, there may be a case where priority calls of a secured wireless resource amount or larger are suddenly generated (for example, a case where multiple car accidents have occurred).

OTHER EXEMPLARY EMBODIMENTS

As mentioned above, the first and second exemplary embodiments have been described as examples of the technique in the present disclosure. However, the technique in the present disclosure is not limited thereto, and is also applicable to exemplary embodiments in which alterations, replacements, omissions, and the like are performed. The first exemplary embodiment and the second exemplary embodiment may be combined with each other.

In the second exemplary embodiment, a plurality of providing base stations may be selected. In other words, a wireless resource may be accommodated to a single request base station from a plurality of providing base stations.

In the second exemplary embodiment, as an example, external device 400 is connected to server 500, but may be connected to each base station 200A. In this case, information obtained from external device 400 is sent to and processed by server 500. Also in this case, it is possible to satisfy a low delay time required by 5G.

In the second exemplary embodiment, a wireless resource accommodated to a request base station from a providing base station may be a wireless resource reserved for a priority call of the providing base station, and may be other wireless resources for the providing base station which are not wireless resources reserved for priority calls of the providing base station.

In the second exemplary embodiment, a description has been made of an example in which second reserve manager 209A sends a notification of insufficiency to cooperation controller 520 after a wireless resource for a priority call used by base station 200A during communication is insufficient. Since a wireless resource for a priority call of base station 200A is secured in advance, second reserve manager 209A may send a notification to cooperation controller 520 in a case where a use proportion of wireless resources for priority calls is equal to or more than a predetermined value (for example, 80% or 90%) instead of a notification after insufficiency. This notification includes information indicating that a wireless resource for a priority call of base station 200A during communication may possibly be insufficient.

Consequently, server 500 can adjust wireless resources among a plurality of base stations 200A before an unexpected situation occurs in wireless communication system 10A and thus a wireless resource of a request base station is insufficient, and can thus prevent a wireless resource for a priority call used by the request base station from being insufficient. Second reserve manager 209A is also the same for first reserve manager 214A.

In the second exemplary embodiment, a description has been made of an example in which each base station 200A reserves wireless resources for priority calls, and server 500 adjusts the reserved wireless resources for priority calls of each base station 200A when necessary. Thus, second reserve manager 209A may reduce a reserve amount of wireless resources for priority calls per base station 200A.

Cooperation controller 520 of server 500 may determine a reduction amount of a reserve amount of wireless resources for priority calls for base station 200A, for example, on the basis of the number of base stations 200A in wireless communication system 10A. The reduction amount of a reserve amount may be determined by using a user interface (UI) (not illustrated) provided in server 500. An original reserve amount (a reserve amount before being reduced) of base station 200A is an amount derived, for example, according to the "method of deriving a reserve amount of wireless resources" described in the first exemplary embodiment.

In a case where a reserve amount is reduced, cooperation controller 520 determines the reduction amount of a reserve amount such that a total reserve amount of wireless resources for priority calls expected to be generated in each base station 200A is equal to or larger than a wireless resource amount required for communication of priority calls expected to be generated in any base station 200A.

A wireless resource for a priority call of at least one request base station may not be reserved, and cooperation controller 520 may accommodate a wireless resource for a priority call to a request base station from a providing base station every time.

Cooperation controller 520 notifies base station controller 510 corresponding to base station 200A in which a reserve amount is reduced of the determined reduction amount of the reserve amount. Second reserve manager 209A of base station controller 510 reserves wireless resources for priority calls by taking into consideration the reduction amount of the reserve amount.

Consequently, server 500 can promote accommodation of wireless resources for priority calls among a plurality of base stations 200A, so as to suppress insufficiency of wireless resources. Server 500 can improve use efficiency of wireless resources by reducing a reserve amount of wireless resources. Second reserve manager 209A is also the same for first reserve manager 214A.

In the first and second exemplary embodiments, 5G channels have been exemplified as radio channels 20, but radio channels 20 may be other channels requiring a short communication delay time.

In the first and second exemplary embodiments, processors 150, 250 and 550 may have any physical configuration. If programmable processors 150, 250 and 550 are used, the processing content can be changed by changing a program, and thus it is possible to increase a degree of freedom of design of processors 150, 250 and 550. Processors 150, 250 and 550 may be formed of a single semiconductor chip, and may be formed of physically plural semiconductor chips. In a case where the processor is formed of a plurality of semiconductor chips, the respective control operations in the first exemplary embodiment may be realized by different semiconductor chips. In this case, such a plurality of semiconductor chips may be considered to form single processor 150, 250 or 550. Processors 150, 250 and 550 may be formed of members (a capacitor and the like) having functions which are different from those of the semiconductor chips. A single semiconductor chip may be configured to realize the functions of processors 150, 250 and 550 and other functions.

In the first and second exemplary embodiments, FIGS. 2 and 3 and FIGS. 7 to 9 illustrate the configurations of terminal 100, base stations 200 and 200A, and server 500, but each configuration may be realized by hardware, and may be realized by software.

(Summary of One Aspect of Present Disclosure)

A wireless base station device of one aspect of the present disclosure includes processor 250, memory 260, and an antenna. Memory 260, by the control of processor 250, stores a wireless resource allocated to a priority call of radio channels 20 via which data is transmitted between a wireless communication terminal and the wireless station device before a priority call is generated. Processor 250 allocates the wireless resource stored in memory 260 to a generated priority call. The antenna performs communication of data of the priority call by using the allocated wireless resource.

The wireless base station device is, for example, base station 200. The wireless communication terminal is, for example, terminal 100. The antenna is, for example, second transmission antenna 213.

Consequently, the wireless base station device can suppress insufficiency of allocatable wireless resources by securing wireless resources for priority calls in advance. The wireless base station device can suppress disconnection or delay of other calls, a data speed reduction, or the like in order to secure a wireless resource for a priority call, and can thus suppress execution of a protocol for disconnection of other calls or reallocation of a wireless resource after disconnection. Therefore, the wireless base station device can reduce a communication delay time related to communication of a priority call. The wireless base station device can suppress deterioration in communication quality of other calls due to the other calls being suddenly disconnected.

In the wireless base station device of one aspect of the present disclosure, radio channels 20 may include downlink channel 22 for transmitting data to the wireless communication terminal and uplink channel 21 for transmitting data from the wireless communication terminal. Memory 260 may separately store a wireless resource used for a priority call of uplink channel 21 and a wireless resource used for a priority call of downlink channel 22. Processor 250 may allocate the wireless resource stored for a priority call of downlink channel 22 in memory 260 to a priority call of downlink channel 22.

Consequently, the wireless base station device can secure wireless resources for priority calls corresponding to respective characteristics in uplink channel 21 and downlink channel 22 having different communication characteristics.

In the wireless base station device of one aspect of the present disclosure, processor 250 may designate a wireless resource allocated to a priority call of uplink channel 21. The antenna may transmit information regarding the designated wireless resource. The antenna is, for example, the transmission antenna of beacon transmitter 215.

Consequently, the wireless base station device can manage a wireless resource for a priority call of uplink channel 21 used by the wireless communication terminal, and can thus easily allocate a wireless resource for a priority call of uplink channel 21 without cooperation between wireless communication terminals.

In the wireless base station device of one aspect of the present disclosure, the antenna may receive first data via uplink channel 21. Processor 250 may determine whether transmitting the first data to host device 300 or transmitting second data based on the first data to at least one of a first wireless communication terminal having transmitted the first data and one or more second wireless communication terminals other than the first wireless communication terminal, on the basis of an application using the first data received via uplink channel 21. The second data may or not be the same as the first data.

Consequently, the wireless base station device can perform communication of data related to a priority call by taking into consideration an application layer. For example, data is returned to the wireless communication terminal without transmitting the data to host device 300 present on a core network, and thus it is possible to further reduce communication delay related to a priority call.

The wireless base station device of one aspect of the present disclosure may include external device interface 206 that acquires data from external device 400. When a call for transmitting data which is input via external device interface 206 is a priority call, processor 250 may allocate a wireless resource stored in memory 260 to the priority call.

Consequently, the wireless base station device can perform communication of data with a priority call in a low delay manner by taking into consideration importance of the data from external device 400.

In the wireless base station device of one aspect of the present disclosure, processor 250 may derive a reserve amount of wireless resources stored in memory 260 on the basis of history information of a generation amount of priority calls, a probability distribution of generation of priority calls, and a probability that insufficiency of wireless resources is permitted for priority calls.

The probability distribution of generation of priority calls is, for example, probability density function $P(x)$. The probability that insufficiency of wireless resources is permitted for priority calls is, for example, the permitted blocking probability (permitted $P_B$).

Consequently, the wireless base station device can determine a reserve amount of wireless resources according to past records of allocation of wireless resources to priority calls, and can thus suppress a reserve amount of wireless resources from being too large or too small.

In the wireless base station device of one aspect of the present disclosure, the processor may update a reserve amount of wireless resources.

Consequently, the wireless base station device can secure wireless resources in advance in a preferable reserve amount corresponding to communication characteristics after being changed even if the communication characteristics in radio channels 20 are changed.

In the wireless base station device of one aspect of the present disclosure, a reserve amount of wireless resources may differ for each wireless base station device.

Consequently, even in a case where installation locations of respective wireless base station devices or occurrence frequencies of priority calls in the respective wireless base stations are different from each other, and thus communication characteristics are different from each other, the wireless base station device can secure wireless resources in advance in a preferable reserve amount corresponding to each wireless base station device.

Wireless communication system 10A of one aspect of the present disclosure includes a wireless communication terminal and a wireless base station device. The wireless base station device transmits information regarding a wireless resource allocated to a priority call of uplink channel 21 via which data is transmitted from the wireless communication terminal to the wireless base station device, before a priority call is generated. The wireless communication terminal receives the information regarding the wireless resource and stores the information in memory 160 before a priority call is generated, allocates the wireless resource stored in memory 160 to a generated priority call, and transmits data of the priority call by using the allocated wireless resource.

Consequently, wireless communication system 10A can suppress insufficiency of allocatable wireless resources by securing wireless resources for priority calls in advance. Wireless communication system 10A can suppress disconnection or delay of other calls, a data speed reduction, or the like in order to secure a wireless resource for a priority call, and can thus suppress execution of a protocol for disconnection of other calls or reallocation of a wireless resource after disconnection. Therefore, wireless communication system 10A can reduce a communication delay time related to communication of a priority call. Wireless communication system 10A can suppress deterioration in communication quality of other calls due to the other calls being suddenly disconnected.

A wireless communication method of one aspect of the present disclosure is a wireless communication method in a wireless base station device including memory 260. Memory 260 stores a wireless resource allocated to a priority call of radio channels 20 via which data is transmitted between a wireless communication terminal and the wireless base station device before a priority call is generated. In this method, the wireless resource stored in the memory is allocated to a generated priority call, and communication of data of the priority call is performed by using the allocated wireless resource.

Consequently, the wireless base station device can suppress insufficiency of allocatable wireless resources by securing wireless resources for priority calls in advance. The wireless base station device can suppress disconnection or delay of other calls, a data speed reduction, or the like in order to secure a wireless resource for a priority call, and can thus suppress execution of a protocol for disconnection of other calls or reallocation of a wireless resource after disconnection. Therefore, the wireless base station device can reduce a communication delay time related to communication of a priority call. The wireless base station device can suppress deterioration in communication quality of other calls due to the other calls being suddenly disconnected.

Wireless communication system 10A of one aspect of the present disclosure includes a plurality of wireless base station devices, and server 500 that manages wireless resources used for communication between the plurality of wireless base station devices and a wireless communication terminal. Server 500 stores, in memory 560, a wireless resource allocated to a priority call of radio channels 20 via which data is transmitted between each of the wireless base station devices and the wireless communication terminal for each wireless base station device before a priority call is generated. When allocatable wireless resources for a first wireless base station device stored in memory 560 are insufficient, server 500 allocates a wireless resource stored for a second wireless base station device of the plurality of wireless base station devices to a priority call generated in the first wireless base station device of the plurality of wireless base station devices. The first wireless base station device performs communication of data of the priority call by using the allocated wireless resource.

The first wireless base station device is, for example, a request base station. The second wireless base station device is, for example, a providing base station.

Consequently, wireless communication system 10A can accommodate wireless resources for priority calls of other wireless base station devices to the first wireless base station device in which wireless resources for priority calls are insufficient, and can thus suppress insufficiency of wireless resources for priority calls Therefore, even in a case where priority calls of a wireless resource amount secured in advance or larger are suddenly generated, wireless communication system 10A can additionally secure wireless resources for priority calls Wireless communication system 10A can reduce a communication delay time related to communication of a priority call by suppressing insufficiency of wireless resources.

In wireless communication system 10A of one aspect of the present disclosure, server 500 may determine whether transmitting first data to host device 300 or transmitting second data based on the first data to at least one of a first wireless communication terminal having transmitted the first data and one or more second wireless communication terminals other than the first wireless communication terminal, on the basis of an application using the first data which is acquired by the first wireless base station device via uplink channel 21 between the first wireless base station device and the wireless communication terminal.

Consequently, even in a case where a plurality of wireless base station devices are present, wireless communication system 10A can perform communication of data related to a priority call by taking into consideration an application layer. For example, wireless communication system 10A returns data to the wireless communication terminal without transmitting the data to host device 300 present on a core network, and can thus further reduce communication delay related to a priority call.

In wireless communication system 10A of one aspect of the present disclosure, the wireless base station device may receive classification information of service quality related to a priority call from the wireless communication terminal. Server 500 may select the second wireless base station device from among the plurality of wireless base station devices on the basis of the classification information of service quality. The classification information of service quality is, for example, a QCI.

Consequently, wireless communication system 10A can efficiently adjust wireless resources for priority calls according to various pieces of service quality.

In the wireless communication system of one aspect of the present disclosure, server 500 may select, as the second wireless base station device, a wireless base station device in which traffic of priority calls matching identification information of a service included in the classification information of service quality occurs a predetermined number of times or more. The identification information of the service is, for example, a QCI identification number or information regarding a service name.

Consequently, wireless communication system 10A can acquire a wireless resource for a priority call for the second wireless base station device providing the same service as a service provided by the first wireless base station device. Therefore, it can be expected that the first wireless base station device can perform communication at the same service quality as service quality provided by the second wireless base station device.

In wireless communication system 10A of one aspect of the present disclosure, server 500 may select, as the second wireless base station device, a wireless base station device in which traffic of priority calls matching information regarding the presence or absence of band guarantee included in the classification information of service quality occurs a predetermined number of times or more. The information regarding the presence or absence of band guarantee is, for example, information regarding a resource type.

Consequently, wireless communication system 10A can acquire a wireless resource for a priority call in a predetermined second wireless base station device as a wireless resource for a priority call in the first wireless base station device. The predetermined second wireless base station device is a second wireless base station device guaranteeing a band in a case where the first wireless base station device guarantees the band and performs communication, and is a second wireless base station device not guaranteeing a band in a case where the first wireless base station device does not guarantee the band and performs communication. Therefore, it can be expected that the first wireless base station device can perform communication at the same service quality as service quality in a case where the second wireless base station device guarantees a band or does not guarantee a band.

In wireless communication system 10A of one aspect of the present disclosure, server 500 may select, as the second wireless base station device, a wireless base station device in which traffic of priority calls satisfying at least one of an allowable delay time or less and an allowable error rate included in the classification information of service quality occurs a predetermined number of times or more.

Consequently, wireless communication system 10A can acquire a wireless resource for a priority call in a predetermined second wireless base station device as a wireless resource for a priority call in the first wireless base station device. The predetermined second wireless base station device is a second wireless base station device performing communication in an allowable delay time or an allowable error rate which is equal to or less than an allowable delay time or an allowable error rate of when the first wireless base station device performs communication of a priority call. Therefore, it can be expected that the first wireless base station device can perform communication at the same service quality as service quality provided by the second wireless base station device.

In wireless communication system 10A of one aspect of the present disclosure, server 500 may allocate a wireless resource stored for the second wireless base station device to a priority call generated in a first wireless base station device of the plurality of wireless base station devices before wireless resources for the first wireless base station device become insufficient.

Consequently, even if an unexpected situation such as generation of a priority call requiring a large number of wireless resources occurs, it is estimated that time is taken to some degree until insufficiency of wireless resources for priority calls occurs. Wireless communication system 10A reserves wireless resources for priority calls in the second wireless base station device as wireless resources for the first wireless base station device before insufficiency of wireless resources occurs, and can thus further reduce a communication delay time even if a large number of priority calls are suddenly generated in the first wireless base station device.

In wireless communication system 10A of one aspect of the present disclosure, server 500 may distribute wireless resources which are equal to or more than a total reserve amount of wireless resources for priority calls required by each wireless base station device, as wireless resources for priority calls of each wireless base station device.

Consequently, since wireless communication system 10A adjusts allocation of wireless resources for priority calls for each wireless base station device, if a total reserve amount of wireless resources for priority calls for each wireless base station device is secured to the extent necessary, a reserve amount of wireless resources for priority calls in any wireless base station device can be reduced.

Server 500 of one aspect of the present disclosure manages wireless resources used for communication between a plurality of wireless base station devices and a wireless communication terminal. Server 500 includes processor 550, memory 560, and a communication interface. Memory 560 stores a wireless resource allocated to a priority call of radio channels 20 via which data is transmitted between each of the wireless base station devices and the wireless communication terminal for each wireless base station device before a priority call is generated. When allocatable wireless resources for a first wireless base station device stored in memory 560 are insufficient, processor 550 allocates a wireless resource stored for a second wireless base station device of the plurality of wireless base station devices to a priority call generated in the first wireless base station device of the plurality of wireless base station devices. The communication interface notifies the first wireless base station device of allocation information of the wireless resource to the priority call.

Consequently, server 500 can accommodate wireless resources for priority calls of other wireless base station devices to a certain wireless base station device in which wireless resources for priority calls are insufficient, and can thus suppress insufficiency of wireless resources for priority calls Therefore, even in a case where priority calls of a wireless resource amount secured in advance or larger in any wireless base station device are suddenly generated, server 500 can additionally secure wireless resources for priority calls. Server 500 can reduce a communication delay time related to communication of a priority call by suppressing insufficiency of wireless resources used in a wireless base station device.

A wireless communication method of one aspect of the present disclosure is a wireless communication method of managing wireless resources used for communication between a plurality of wireless base station devices and a wireless communication terminal and performing communication. In this method, a wireless resource allocated to a priority call of radio channels 20 via which data is transmitted between each of the wireless base station devices and a wireless communication terminal is stored in memory 560 for each wireless base station device before a priority call is generated; when allocatable wireless resources for a first wireless base station device stored in memory 560 are insufficient, a wireless resource stored for a second wireless base station device of the plurality of wireless base station devices is allocated to a priority call generated in the first wireless base station device of the plurality of wireless base station devices; and, communication of data of the priority call is performed by using the allocated wireless resource.

Consequently, wireless communication system 10A or server 500 can accommodate wireless resources for priority calls of other wireless base station devices to a certain wireless base station device in which wireless resources for priority calls are insufficient, and can thus suppress insufficiency of wireless resources for priority calls Therefore, even in a case where priority calls of a wireless resource amount secured in advance or larger in any wireless base station device are suddenly generated, wireless communication system 10A or server 500 can additionally secure wireless resources for priority calls. Wireless communication system 10A or server 500 can reduce a communication delay time related to communication of a priority call by suppressing insufficiency of wireless resources used in a wireless base station device.

INDUSTRIAL APPLICABILITY

The present disclosure is useful for a wireless base station device, a server, a wireless communication system, a wireless communication method, and the like capable of reducing a communication delay time related to communication of a priority call.

REFERENCE MARKS IN THE DRAWINGS

10, 10A WIRELESS COMMUNICATION SYSTEM
20 RADIO CHANNEL
21 UPLINK CHANNEL
22 DOWNLINK CHANNEL
30 OPTICAL CHANNEL
100 TERMINAL
101 FIRST RECEPTION ANTENNA
102 FIRST WIRELESS RECEIVER
103 FIRST PACKET DECODER
104 FIRST PRIORITY CALL DETERMINATOR
105 FIRST WIRELESS RESOURCE ALLOCATOR
106 FIRST PACKET GENERATOR
107 FIRST WIRELESS TRANSMITTER
108 FIRST TRANSMISSION ANTENNA
109 BEACON RECEIVER
150, 250, 550 PROCESSOR
160, 260, 560 MEMORY
200, 200A, 200A1, 200A2, 200A3, 200A4 BASE STATION
201 SECOND RECEPTION ANTENNA
202 SECOND WIRELESS RECEIVER
203 SECOND PACKET DECODER
204 RETURN DETERMINATOR
205 COMMUNICATION INTERFACE
206 EXTERNAL DEVICE INTERFACE
207 DATA GENERATOR
208 SECOND PRIORITY CALL DETERMINATOR
209 SECOND RESERVE MANAGER
210 SECOND WIRELESS RESOURCE ALLOCATOR
211 SECOND PACKET GENERATOR
212 SECOND WIRELESS TRANSMITTER
213 SECOND TRANSMISSION ANTENNA
214 FIRST RESERVE MANAGER
215 BEACON TRANSMITTER
300 HOST DEVICE
400 EXTERNAL DEVICE
500 SERVER
510, 510A, 510B, 510C, 510D BASE STATION CONTROLLER
520 COOPERATION CONTROLLER

The invention claimed is:

1. A wireless base station device comprising:
a processor; and
a memory coupled to the processor;
wherein the processor, in operation,
controls transmission, to a wireless communication terminal, of information regarding vacant wireless resources among wireless resources reserved for priority calls via which priority data requiring a low delay transmission are transmitted,
counts a number of one or more priority calls that are generated,
responsive to determining that the wireless resources reserved for priority calls can be allocated to the one or more priority calls that are generated, allocates the wireless resources reserved for priority calls to the one or more priority calls that are generated,
controls transmission of priority data via the one or more priority calls that are generated using the allocated wireless resources,
responsive to determining that the wireless resources reserved for priority calls cannot be allocated to the one or more priority calls that are generated, counts a number of insufficient wireless resources which indicates a shortage of the wireless resources required for the one or more priority calls that are generated, and determines whether disconnectable call(s) exist, wherein the disconnectable call(s) are non-priority call(s) that are currently connected,
responsive to determining that the disconnectable call(s) exist, disconnects the disconnectable call(s) and allocates wireless resources previously allocated to the disconnectable call(s) to the one or more priority calls that are generated,
responsive to determining that the disconnectable call(s) do not exist, loses the one or more priority calls that are generated, and
adjusts a reserve amount of the wireless resources reserved for the priority calls based on the counted number of insufficient wireless resources, by increasing the reserve amount in response to a parameter, which corresponds to the counted number of insufficient wireless resources, exceeding a threshold value, and decreasing the reserve amount in response to the parameter not exceeding the threshold value.

2. The wireless base station device of claim 1,
wherein radio channels used to transmit the priority data and non-priority data include a downlink channel for transmitting data to the wireless communication terminal and an uplink channel for transmitting data from the wireless communication terminal,
wherein the memory, in operation, separately indicates a wireless resource used for a priority call of the uplink channel and a wireless resource used for a priority call of the downlink channel, and wherein the processor, in operation, allocates the wireless resource indicated in the memory for a priority call of the downlink channel to a priority call of the downlink channel.

3. The wireless base station device of claim 2, wherein the processor, in operation,
designates a wireless resource, which is allocated to a priority call of the uplink channel, and
controls transmission, to the wireless communication terminal, of information regarding the designated wireless resource.

4. The wireless base station device of claim 2,
wherein the processor, on the basis of an application using first data received via the uplink channel from a first wireless communication terminal, determines whether to transmit the first data to a host device or to transmit second data based on the first data to at least one of the first wireless communication terminal and another wireless communication terminal.

5. The wireless base station device of claim 1, further comprising:
an external device interface that acquires data from an external device,
wherein, when a call for transmitting data which is input via the external device interface is a priority call, the processor allocates a wireless resource indicated in the memory to the priority call.

6. The wireless base station device of claim 1,
wherein the processor derives the reserve amount of the wireless resources reserved for the priority calls, based on one or more of: history information of a generation amount of priority calls, a probability distribution of generation of priority calls, and a probability that the wireless resources reserved for the priority calls becomes insufficient.

7. The wireless base station device of claim 1,
wherein the processor updates the reserve amount of the wireless resources reserved for the priority calls.

8. The wireless base station device of claim 1,
wherein the reserve amount of wireless resources differs for each wireless base station device.

9. A wireless communication method in a wireless base station device including a memory, the method comprising:
transmitting, to a wireless communication terminal, information regarding vacant wireless resources among wireless resources reserved for priority calls via which priority data requiring a low delay transmission are transmitted,
counting a number of one or more priority calls that are generated,
responsive to determining that the wireless resources reserved for priority calls can be allocated to the one or more priority calls that are generated, allocating the wireless resources reserved for priority calls to the one or more priority calls that are generated,
transmitting priority data via the one or more priority calls that are generated using the allocated wireless resources,
responsive to determining that the wireless resources reserved for priority calls cannot be allocated to the one or more priority calls that are generated, counting a number of insufficient wireless resources which indicates a shortage of the wireless resources required for the one or more priority calls that are generated, and determining whether disconnectable call(s) exist, wherein the disconnectable call(s) are non-priority call(s) that are currently connected,
responsive to determining that the disconnectable call(s) exist, disconnecting the disconnectable call(s) and allocating wireless resources previously allocated to the disconnectable call(s) to the one or more priority calls that are generated,
responsive to determining that the disconnectable call(s) do not exist, losing the one or more priority calls that are generated, and
adjusting a reserve amount of the wireless resources reserved for the priority calls based on the counted number of insufficient wireless resources, by increasing the reserve amount in response to a parameter, which corresponds to the counted number of insufficient wireless resources, exceeding a threshold value, and decreasing the reserve amount in response to the parameter not exceeding the threshold value.

10. A server which manages wireless resources used for communication between a plurality of wireless base station devices and a wireless communication terminal, the server comprising:
a processor; and
a memory coupled to the processor;
wherein the processor, in operation,
controls transmission, to the wireless communication terminal, of information regarding vacant wireless resources among wireless resources reserved for priority calls via which priority data requiring a low delay transmission are transmitted between the wireless base station devices and the wireless communication terminal, respectively,
counts a number of one or more priority calls that are generated for a first wireless base station device among the wireless base station devices,
responsive to determining that the wireless resources reserved for priority calls for the first wireless base station device can be allocated to the one or more priority calls that are generated for the first wireless base station device, allocates the wireless resources reserved for priority calls for the first wireless base station device to the one or more priority calls that are generated for the first wireless base station device,
responsive to determining that the wireless resources reserved for priority calls for the first wireless base station device cannot be allocated to the one or more priority calls that are generated for the first wireless base station device, counts a number of insufficient wireless resources which indicates a shortage of the wireless resources required for the one or more priority calls that are generated for the first wireless base station device, and determines whether disconnectable call(s) exist, wherein the disconnectable call(s) are non-priority call(s) that are currently connected,
responsive to determining that the disconnectable call(s) exist, disconnects the disconnectable call(s) and allocates wireless resources previously allocated to the disconnectable call(s) to the one or more priority calls that are generated for the first wireless base station device, responsive to determining that the disconnectable call(s) do not exist, loses the one or more priority calls that are generated for the first wireless base station device, and
adjusts a reserve amount of the wireless resources reserved for the priority calls generated for the first wireless base station device based on the counted number of insufficient wireless resources, by increasing the reserve amount in response to a parameter, which corresponds to the counted number of insufficient wireless resources, exceeding a threshold value, and decreasing the reserve amount in response to the parameter not exceeding the threshold value.

11. The server of claim 10,
wherein the processor, on the basis of an application using first data received by the first wireless base station device via an uplink channel from a first wireless communication terminal, determines whether to transmit the first data to a host device or to transmit second data based on the first data to at least one of the first wireless communication terminal and another wireless communication terminal.

12. The server of claim 10,
wherein the processor, in operation, distributes wireless resources, which are equal to or more than a total reserve amount of wireless resources for priority calls required by each of the wireless base station devices, to each wireless base station device.

13. The server of claim 10, wherein the processor, in operation,
responsive to determining that the wireless resources reserved for priority calls for the first wireless base station device cannot be allocated to the one or more priority calls that are generated for the first wireless base station device, allocates the wireless resources reserved for priority calls for a second wireless base station device among the wireless base station devices to the first wireless base station device, and
controls transmission of the priority data via the one or more priority calls that are generated for the first wireless base station device using the allocated wireless resources.

14. The server of claim 13,
wherein the processor, based on classification information of service quality received from the first wireless communication terminal, selects the second wireless base station device from among the plurality of wireless base station devices.

15. The server of claim 14,
wherein the processor selects, as the second wireless base station device, a wireless base station device in which traffic of priority calls matching identification information of a service included in the classification information of service quality exceeds a threshold.

16. The server of claim 14,
wherein the processor selects, as the second wireless base station device, a wireless base station device in which traffic of priority calls matching information regarding the presence or absence of band guarantee included in the classification information of service quality exceeds a threshold.

17. The server of claim 14,
wherein the processor selects, as the second wireless base station device, a wireless base station device in which traffic of priority calls satisfying at least one of an allowable delay time and an allowable error rate included in the classification information of service quality exceeds a threshold.

18. The server of claim 13,
wherein the processor, prior to determining that the wireless resources reserved for priority calls for the first wireless base station device cannot be allocated to the one or more priority calls that are generated for the first wireless base station device, allocates the wireless resources reserved for priority calls for the second wireless base station device to the one or more priority calls generated for the first wireless base station device.

19. A wireless communication method of managing wireless resources used for communication between a plurality of wireless base station devices and a wireless communication terminal and performing communication, the method comprising:
transmitting, to the wireless communication terminal, information regarding vacant wireless resources among wireless resources reserved for priority calls via which priority data requiring a low delay transmission are transmitted between the wireless base station devices and the wireless communication terminal, respectively;
counting a number of one or more priority calls that are generated for a first wireless base station device among the wireless base station devices;
responsive to determining that the wireless resources reserved for priority calls for the first wireless base station device can be allocated to the one or more priority calls that are generated for the first wireless base station device, allocating the wireless resources reserved for priority calls for the first wireless base station device to the one or more priority calls that are generated for the first wireless base station device;
responsive to determining that the wireless resources reserved for priority calls for the first wireless base station device cannot be allocated to the one or more priority calls that are generated for the first wireless base station device, counting a number of insufficient wireless resources which indicates a shortage of the wireless resources required for the one or more priority calls that are generated for the first wireless base station device, and determining whether disconnectable call(s) exist, wherein the disconnectable call(s) are non-priority call(s) that are currently connected;
responsive to determining that the disconnectable call(s) exist, disconnecting the disconnectable call(s) and allocating wireless resources previously allocated to the disconnectable call(s) to the one or more priority calls that are generated for the first wireless base station device;
responsive to determining that the disconnectable call(s) do not exist, losing the one or more priority calls that are generated for the first wireless base station device, and
adjusting a reserve amount of the wireless resources reserved for the priority calls generated for the first wireless base station device based on the counted number of insufficient wireless resources, by increasing the reserve amount in response to a parameter, which corresponds to the counted number of insufficient wireless resources, exceeding a threshold value, and decreasing the reserve amount in response to the parameter not exceeding the threshold value.

* * * * *